(12) United States Patent
Hamada

(10) Patent No.: US 12,348,690 B2
(45) Date of Patent: Jul. 1, 2025

(54) IMAGE READING APPARATUS AND IMAGE READING METHOD

(71) Applicant: CANON KABUSHIKI KAISHA, Tokyo (JP)

(72) Inventor: Kaoru Hamada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/429,881

(22) Filed: Feb. 1, 2024

(65) Prior Publication Data

US 2024/0267472 A1 Aug. 8, 2024

(30) Foreign Application Priority Data

Feb. 6, 2023 (JP) ................................ 2023-016057

(51) Int. Cl.
*H04N 1/00* (2006.01)
*H04N 1/387* (2006.01)

(52) U.S. Cl.
CPC ..... *H04N 1/00824* (2013.01); *H04N 1/00652* (2013.01); *H04N 1/00811* (2013.01); *H04N 1/00909* (2013.01); *H04N 1/3878* (2013.01)

(58) Field of Classification Search
CPC ........... H04N 1/00824; H04N 1/00652; H04N 1/00811; H04N 1/00909; H04N 1/3878
USPC ................................................ 358/1.1–1.18
See application file for complete search history.

(56) References Cited

U.S. PATENT DOCUMENTS

| | | | |
|---|---|---|---|
| 7,538,907 B2 * | 5/2009 | Nagasaka | ............ H04N 1/0313 358/463 |
| 7,719,726 B2 | 5/2010 | Kamei et al. | |
| 8,494,392 B2 * | 7/2013 | Kasahara | ........... G03G 15/6564 358/1.9 |
| 11,750,761 B2 | 9/2023 | Tanaka | |

FOREIGN PATENT DOCUMENTS

| | | |
|---|---|---|
| JP | 2005117090 A | 4/2005 |
| JP | 4521940 B2 * | 8/2010 |
| JP | 2015211308 A | 11/2015 |
| JP | 2016066836 A | 4/2016 |

* cited by examiner

*Primary Examiner* — Gabriel I Garcia
(74) *Attorney, Agent, or Firm* — ROSSI, KIMMS & McDOWELL LLP

(57) ABSTRACT

An image reading apparatus includes a conveyor configured to convey an original, a reader configured to read the original conveyed by the conveyor, a detector configured to detect an abnormal image generated in a read image of the original obtained by the reader, a correction processor configured to correct the abnormal image, an operation unit configured to receive a setting of an operation mode set by a user, and a controller. The controller is configured to, in a case where the detector detects the abnormal image, control the correction processor to correct the abnormal image in a case in which a first operation mode of continuing image reading is set, and stop conveyance of the original performed by the conveyor and give a notification of generation of the abnormal image in a case in which a second operation mode of interrupting the image reading is set.

10 Claims, 23 Drawing Sheets

CONVEYING DIRECTION ←

ABCDEFG

ABCDEFGHIJKLMNOPQRSTUVWXYZABCDEFGHIJKLMNOPQ
RSTUVWXYZABCDEFGHIJKLMNOPQRSTUVWXYZABCDEFGH
IJKLMNOPQRSTUVWXYZABCDEFGHIJKLMNOPQRSTUVWXY
ZABCDEFGHIJKLMNOABCDEFGHIJKLMNOPQRSTUVWXYZP
QRSTUVWXYZ

ABCDEFGHIJKLMNOPQRSTUVWXYZABCDEFGHIJKLMNOPQ
RSTUVWXYZABCDEFGHIJKLMNOPQRSTUVWXYZABCDEFGH
IJKLMNOPQRSTUVWXYZABCDEFGHIJKLMNOPQRSTUVWXY
ZABCDEFGHIJKLMNOABCDEFGHIJKLMNOPQRSTUVWXYZP
QRSTUVWXYZ

ABCDEFGHIJKLMNOPQRSTUVWXYZABCDEFGHIJKLMNOPQ
RSTUVWXYZABCDEFGHIJKLMNOPQRSTUVWXYZABCDEFGH
IJKLMNOPQRSTUVWXYZABCDEFGHIJKLMNOPQRSTUVWXY
ZABCDEFGHIJKLMNOABCDEFGHIJKLMNOPQRSTUVWXYZP
QRSTUVWXYZ

FIG. 6A

CONVEYING DIRECTION ←

$P_{1S}(P_{1SX}, P_{1SY})$    $G_1$   ↓$W_1$   $P_{1E}(P_{1EX}, P_{1EY})$

ABCDEFG    $P_{2S}(P_{2SX}, P_{2SY})$   $W_2$

ABCDEFGHIJKLMNOPQRSTUVWXYZABCDEFGHIJKLMNOPQ
RSTUVWXYZABCDEFGHIJKLMNOPQRSTUVWXYZABCDEFGH   $G_2$
IJKLMNOPQRSTUVWXYZABCDEFGHIJKLMNOPQRSTUVWXY   $P_{2E}(P_{2EX}, P_{2EY})$
ZABCDEFGHIJKLMNOABCDEFGHIJKLMNOPQRSTUVWXYZP
QRSTUVWXYZ

ABCDEFGHIJKLMNOPQRSTUVWXYZABCDEFGHIJKLMNOPQ
RSTUVWXYZABCDEFGHIJKLMNOPQRSTUVWXYZABCDEFGH
IJKLMNOPQRSTUVWXYZABCDEFGHIJKLMNOPQRSTUVWXY
ZABCDEFGHIJKLMNOABCDEFGHIJKLMNOPQRSTUVWXYZP
$G_3$   QRST $W_3$ XYZ $P_{1S}(P_{3SX}, P_{3SY})$    $P_{3E}(P_{3EX}, P_{3EY})$

ABCDEFGHIJKLMNOPQRSTUVWXYZABCDEFGHIJKLMNOPQ   $G_4$
RSTUVWXYZABCDEFGHIJKLMNOPQRSTUVWXYZABCDEFGH
IJKLMNOPQRSTUVWXYZABCDEFGHIJKLMNOPQRSTUVWXY   $P_{4E}(P_{4EX}, P_{4EY})$
ZABCDEFGHIJKLMNOABCDEFGHIJKLMNOPQRSTUVWXYZP
QRSTUVWXYZ    $P_{4S}(P_{4SX}, P_{4SY})$   $W_4$

FIG. 6B

| | | | | | |
|---|---|---|---|---|---|
| G1 | $P_{1SX}$ | $P_{1SY}$ | $P_{1EX}$ | $P_{1EY}$ | $W_1$ |
| G2 | $P_{2SX}$ | $P_{2SY}$ | $P_{2EX}$ | $P_{2EY}$ | $W_2$ |
| G3 | $P_{3SX}$ | $P_{3SY}$ | $P_{3EX}$ | $P_{3EY}$ | $W_3$ |
| G4 | $P_{4SX}$ | $P_{4SY}$ | $P_{4EX}$ | $P_{4EY}$ | $W_4$ |

FIG. 7

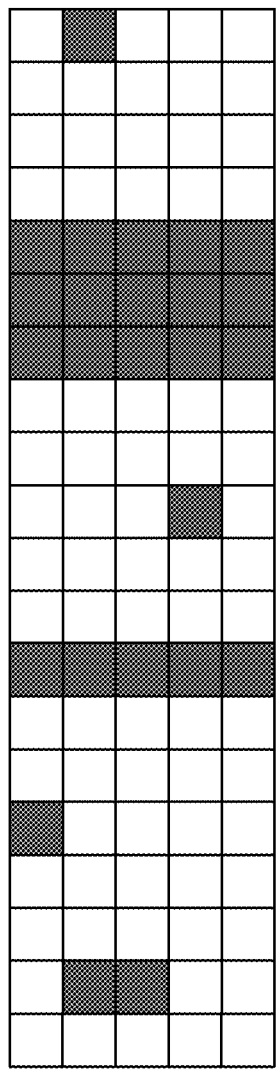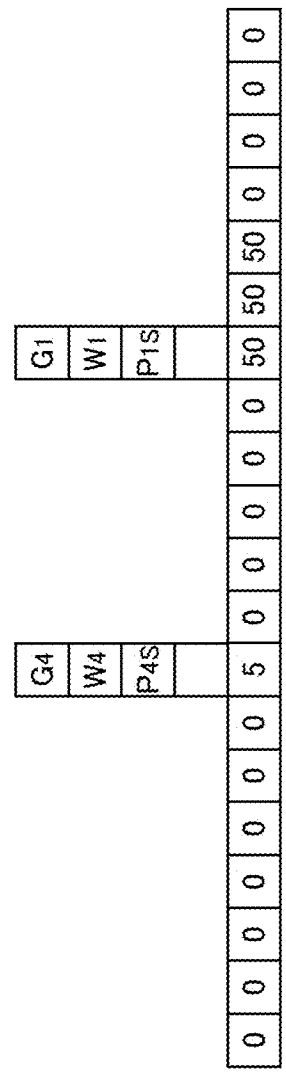
FIG. 10B

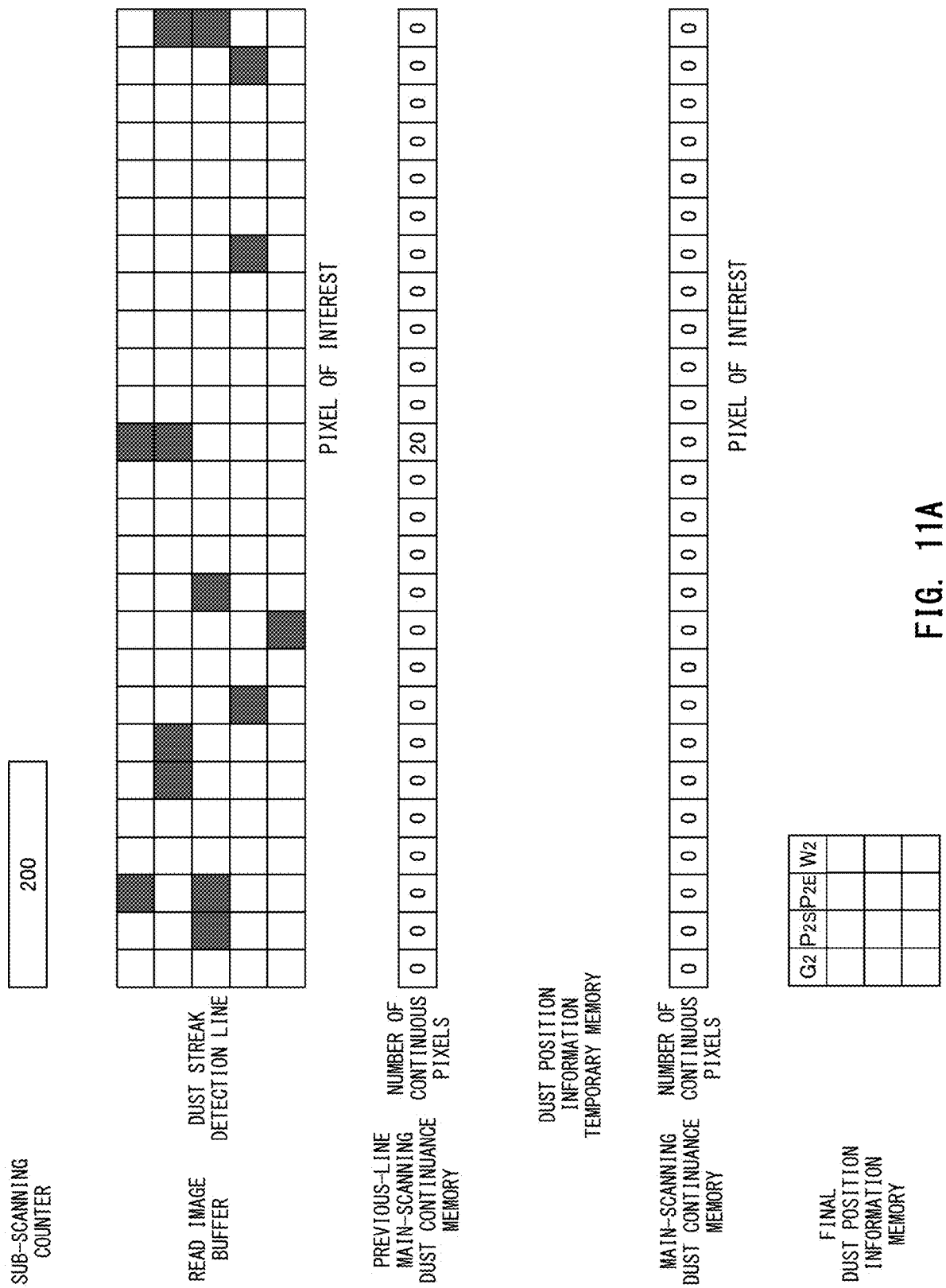

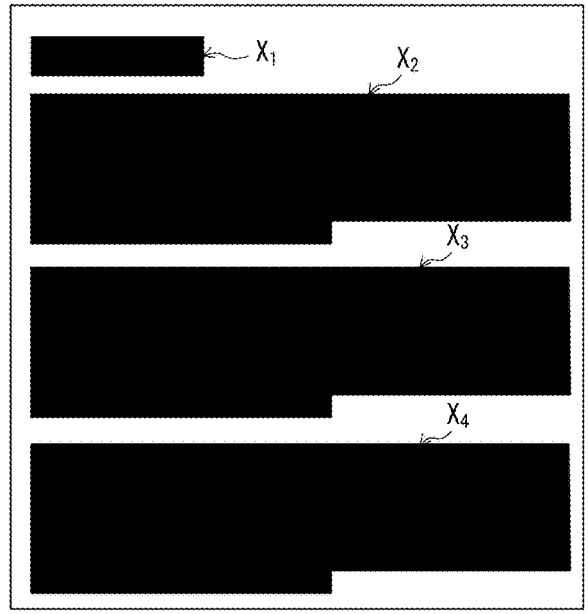
FIG. 22A
FIG. 22B
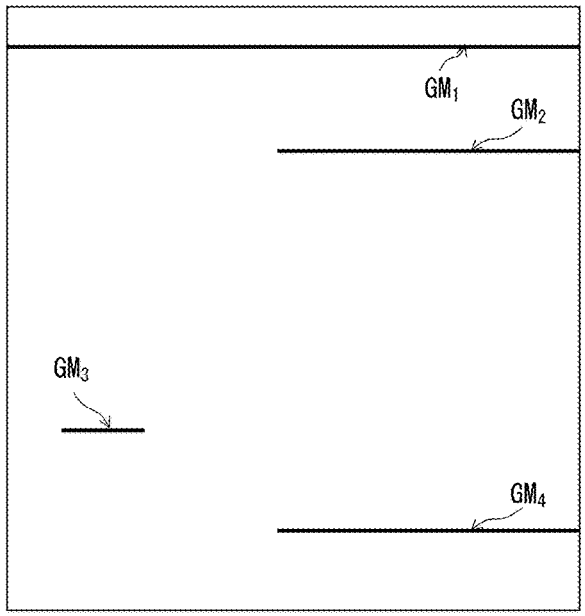
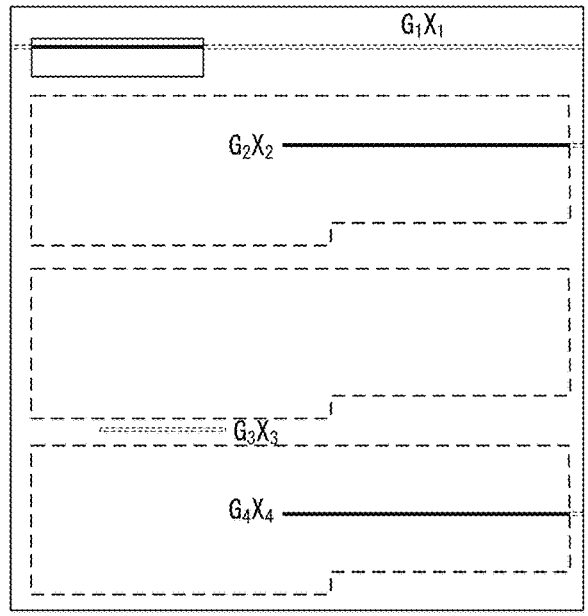
FIG. 22C
FIG. 22D

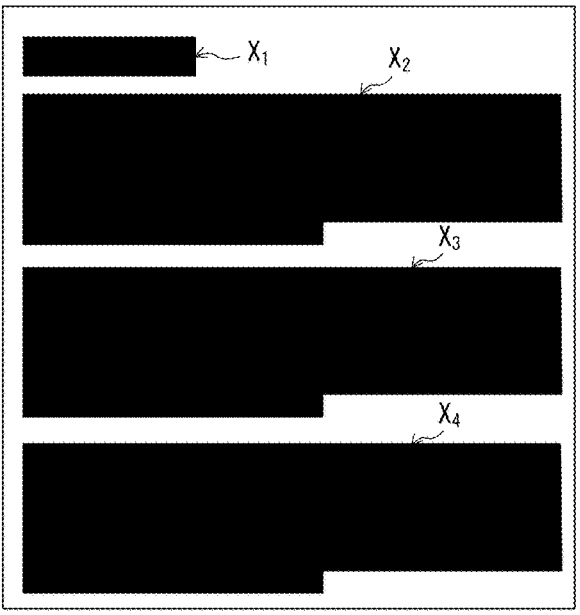
FIG. 23A
FIG. 23B
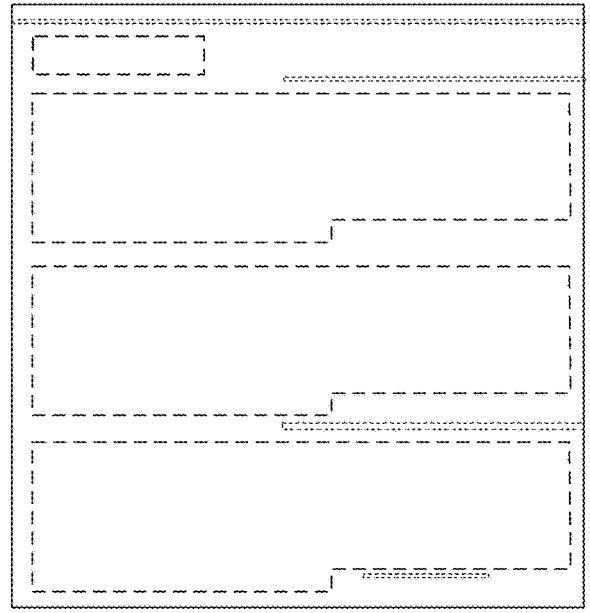
FIG. 23C
FIG. 23D

IMAGE READING APPARATUS AND IMAGE READING METHOD

BACKGROUND OF THE INVENTION

Field of the Invention

The present disclosure relates to an image reading apparatus that reads an image from an original.

Description of the Related Art

An image forming apparatus, such as a copying machine, a fax machine, or a multifunction peripheral, includes an image reading apparatus that reads an image from an original. Such an image reading apparatus often includes an automatic original conveying device (hereinafter referred to as "auto document feeder (ADF)") in order to continuously read a plurality of originals. The ADF conveys the originals one by one to a reading position of the image reading apparatus. The original is applied with light when passing above a glass provided at the reading position (hereinafter referred to as "flow reading glass"). The applied light is reflected by the original to be received by a reading sensor. The reading sensor converts a light receiving result of the reflected light into an electrical signal, and subjects this electrical signal to predetermined processing to generate image data indicating an image that has been read (hereinafter referred to as "read image"). The reading of the original is performed as described above.

In a case where a foreign matter (in this case, dust) adheres to one or both of the reading sensor and the flow reading glass, the read image includes an image of the dust in addition to the image of the original. The image of the dust becomes, in the read image, for example, a streak-like image (hereinafter referred to as "dust streak") extending in a conveying direction of the original. In Japanese Patent Application Laid-open No. 2005-117090 and Japanese Patent Application Laid-open No. 2016-066836, there are disclosed image reading apparatus capable of reducing the dust streak. Those image reading apparatuses detect the dust streak, and correct the dust streak by replacing a reading value of an abnormal pixel causing the dust streak with a reading value of a pixel adjacent to the detected dust streak.

In laws and regulations governing how to handle electronic documents, similarly to the case of paper documents, letters and diagrams are required to be readable (readability), and the read image is required to be the same as the paper document (integrity). However, in a case where a dust streak is generated on the letters of the read image, the letters are also corrected in a case where the dust streak is corrected, and thus the readability cannot be ensured. Further, the correction of the dust streak may cause a change to a letter different from the original letter, and thus the integrity cannot be ensured. As described above, in a case where the dust streak is generated, the readability and the integrity are not ensured.

FIG. 25A to FIG. 25E are explanatory diagrams of the dust streak. FIG. 25A shows a read image in which no dust streak is generated. FIG. 25B shows a read image in which dust streaks are generated. The dust streaks are each generated in a straight line in the conveying direction of the original. FIG. 25C, FIG. 25D, and FIG. 25E show an example in which the readability and the integrity are lost due to the correction of the dust streak. FIG. 25C shows an original letter printed on the original. FIG. 25D shows a state in which a dust streak is generated on the letter of FIG. 25C. In a case where the dust streak is corrected, a reading value of an abnormal pixel 1 of the dust streak is corrected by reading values of adjacent pixels 2a and 2b. FIG. 25E shows a letter after the correction. A vertical line of the original letter is eliminated through the correction, and hence the letter after the correction is a letter different from the original letter. As described above, in a case where the dust streak overlaps the letter, it becomes difficult to ensure the readability and the integrity.

SUMMARY OF THE INVENTION

According to one embodiment of the present disclosure, there is provided an image reading apparatus including a conveyor configured to convey an original, a reader configured to read the original conveyed by the conveyor, a detector configured to detect an abnormal image generated in a read image of the original obtained by the reader, a correction processor configured to correct the abnormal image, an operation unit configured to receive a setting of an operation mode set by a user, and a controller configured to, in a case where the detector detects the abnormal image, control the correction processor to correct the abnormal image in a case in which a first operation mode of continuing image reading is set through the operation unit, and stop conveyance of the original performed by the conveyor and give a notification of generation of the abnormal image in a case in which a second operation mode of interrupting the image reading is set through the operation unit.

According to another embodiment of the present disclosure, there is provided an image reading method using an image reading device, the image reading device including a conveyor configured to convey an original a reader configured to read the original conveyed by the conveyor, a detector configured to detect an abnormal image generated in a read image of the original obtained by the reader, a correction processor configured to correct the abnormal image, and an operation unit configured to receive a setting of an operation mode set by a user, the image reading method including, in a case where the detector detects the abnormal image, correcting, by the correction processor, the abnormal image in a case in which a first operation mode of continuing image reading is set through the operation unit, and stopping conveyance of the original performed by the conveyor and giving a notification of generation of the abnormal image in a case in which a second operation mode of interrupting the image reading is set through the operation unit.

Further features of the present invention will become apparent from the following description of exemplary embodiments (with reference to the attached drawings).

BRIEF DESCRIPTION OF THE DRAWINGS

FIG. 6A and FIG. 6B are explanatory diagrams of dust streaks.

FIG. 7 is an explanatory diagram of dust position information.

FIGS. 10A and 10B are explanatory diagrams of a memory configuration in each of a front-side dust streak detector and a back-side dust streak detector.

FIGS. 11A and 11B are explanatory diagrams of the memory configuration in each of the front-side dust streak detector and the back-side dust streak detector.

FIG. 22A, FIG. 22B, FIG. 22C, and FIG. 22D are explanatory diagrams of the dust overlap determination processing.

FIG. 23A, FIG. 23B, FIG. 23C, and FIG. 23D are explanatory diagrams of the dust overlap determination processing.

DESCRIPTION OF THE EMBODIMENTS

Now, referring to the accompanying drawings, description is given of exemplary embodiments of the present disclosure.

First Embodiment

Figure 1:
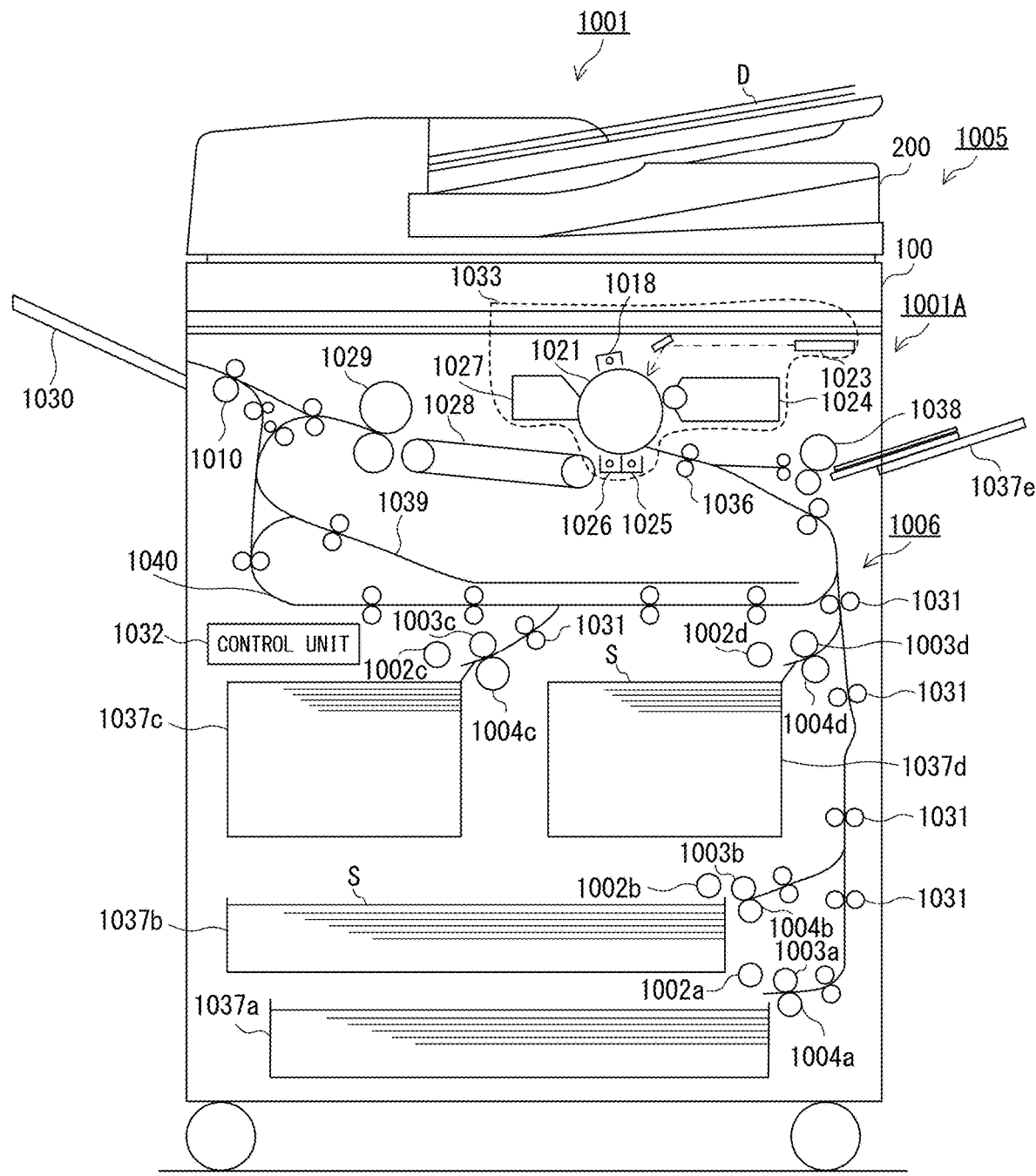
FIG. 1 is a configuration diagram of an image forming apparatus.

FIG. 1 is a configuration diagram of an image forming apparatus including an image reading apparatus according to a first embodiment of the present disclosure. An image forming apparatus 1001 includes a reader 1005 serving as the image reading apparatus, which is mounted above a printer 1001A, and is achieved by, for example, a copying machine, a fax machine, or a multifunction peripheral (MFP). The image forming apparatus 1001 is provided with an operation unit, which is described later, as a user interface including an input interface and an output interface.

The reader 1005 includes a scanner 100 and an ADF 200 that automatically conveys an original D. The ADF 200 is mounted to the scanner 100 so as to be openable and closable. The scanner 100 reads an image from the original D by optically scanning the original D. The reader 1005 transmits image data indicating the read image of the original D to a control unit 1032 of the printer 1001A. The printer 1001A forms an image that is based on the acquired image data on a sheet S, which is a recording medium, through control of the control unit 1032.

The printer 1001A includes an image forming unit 1033 that forms an image on the sheet S, a sheet feeder 1006 that feeds the sheet S to the image forming unit 1033, and a fixing device 1029. The sheet S is conveyed from the sheet feeder 1006 to the image forming unit 1033 to have the image transferred thereonto, and then has the image fixed thereto by the fixing device 1029 to be delivered to a delivery tray 1030.

The sheet feeder 1006 includes a plurality of sheet containers 1037a, 1037b, 1037c, and 1037d that can contain sheets S having mutually different sizes. The sheets S contained in the sheet containers 1037a, 1037b, 1037c, and 1037d are fed from the sheet containers 1037a, 1037b, 1037c, and 1037d by corresponding pickup rollers 1002a, 1002b, 1002c, and 1002d, respectively.

The fed sheets S are separated one by one by corresponding feed rollers 1003a, 1003b, 1003c, and 1003d and retard rollers 1004a, 1004b, 1004c, and 1004d, respectively, to be conveyed to corresponding conveyance roller pairs 1031. The sheets S are sequentially passed to the plurality of conveyance roller pairs 1031 arranged along a sheet conveyance path to be conveyed to a registration roller pair 1036 arranged in the sheet conveyance path.

The sheet feeder 1006 also includes a manual feed tray 1037e. The sheet S placed on the manual feed tray 1037e by a user is fed into the printer 1001A by a feeding roller 1038 to be conveyed to the registration roller pair 1036.

The registration roller pair 1036 stops a leading edge of the sheet S to correct skew feeding. The registration roller pair 1036 resumes conveying the sheet S to the image forming unit 1033 in accordance with progress of a toner image forming process being performed by the image forming unit 1033.

The image forming unit 1033 in the first embodiment is an apparatus employing an electrophotographic method involving a photosensitive drum 1021. The image forming unit 1033 may be configured to form an image through use of, for example, an ink-jet method or an offset printing method.

The photosensitive drum 1021 is a drum-shaped photosensitive member having a photosensitive layer on a surface thereof, and is rotatable about a drum shaft along a conveying direction of the sheet S. A charging device 1018, an exposure device 1023, a developing device 1024, a transfer charging device 1025, a separation charging device 1026, and a cleaner 1027 are arranged around the photosensitive drum 1021. The charging device 1018 uniformly charges the surface of the photosensitive drum 1021. The exposure device 1023 exposes the charged surface of the photosensitive drum 1021 to light based on the image data acquired from the reader 1005 or an external device to form an electrostatic latent image on the photosensitive drum 1021.

The developing device 1024 contains a two-component developer including a toner and a carrier. The developing device 1024 supplies a charged toner to the photosensitive drum 1021 and causes the charged toner to adhere to the electrostatic latent image. Thus, the electrostatic latent image is developed, and a toner image is formed on the surface of the photosensitive drum 1021. The toner image borne on the photosensitive drum 1021 is transferred onto the sheet S by a bias electric field formed by the transfer charging device 1025. The sheet S is conveyed from the registration roller pair 1036 to the transfer charging device 1025 in accordance with a timing at which the toner image is formed.

The sheet S onto which the toner image has been transferred is separated from the photosensitive drum 1021 by a bias electric field formed by the separation charging device 1026, and is conveyed to the fixing device 1029 by a pre-fixing conveyor 1028. The cleaner 1027 removes an adhering substance such as the toner remaining on the photosensitive drum 1021 without being transferred onto the sheet S. Thus, the photosensitive drum 1021 can be ready for the subsequent image forming operation.

The fixing device 1029 nips and conveys the sheet S through use of a roller pair. At that time, the fixing device 1029 applies heat and pressure to the sheet S, to thereby melt the toner image and fix the toner image to the sheet S. After the fixation of the toner image, image formation on the sheet S is completed. The sheet S on which the image has been formed is delivered through a delivery roller pair 1010 to the delivery tray 1030 that protrudes outward from the printer 1001A.

In a case where duplex printing is performed, the sheet S on which the image has been formed on one side (first side) passes through the fixing device 1029 and is then conveyed to a reverser 1039 in order to form an image on the other side (second side). The sheet S has an image forming side reversed from the first side to the second side by the reverser 1039, and is conveyed to a double-sided conveyor 1040. The double-sided conveyor 1040 conveys, to the registration roller pair 1036, the sheet S of which the image forming side has been reversed. The sheet S is conveyed from the registration roller pair 1036 to the image forming unit 1033 to have an image formed on the second side, and is then delivered to the delivery tray 1030.

<Reader>

Figure 2:
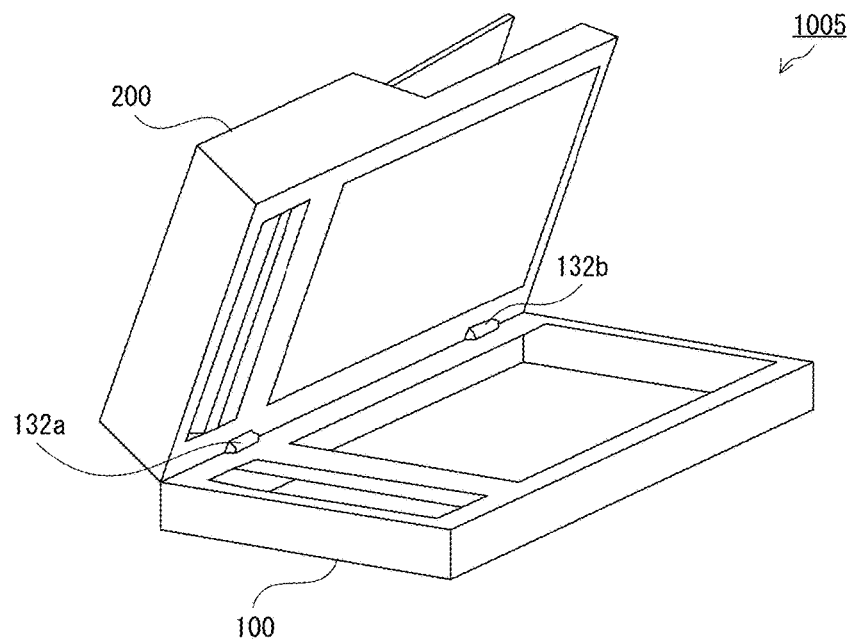
FIG. 2 is an exterior perspective view of an image reading apparatus.

FIG. 2 is an exterior perspective view of the reader 1005. The ADF 200 is mounted to the scanner 100 so as to be openable and closable by hinges 132a and 132b. In FIG. 2, the ADF 200 is in an open state with respect to the scanner 100. The scanner 100 incorporates a controller, which is described later. The controller controls the operation of the reader 1005.

Figure 3:
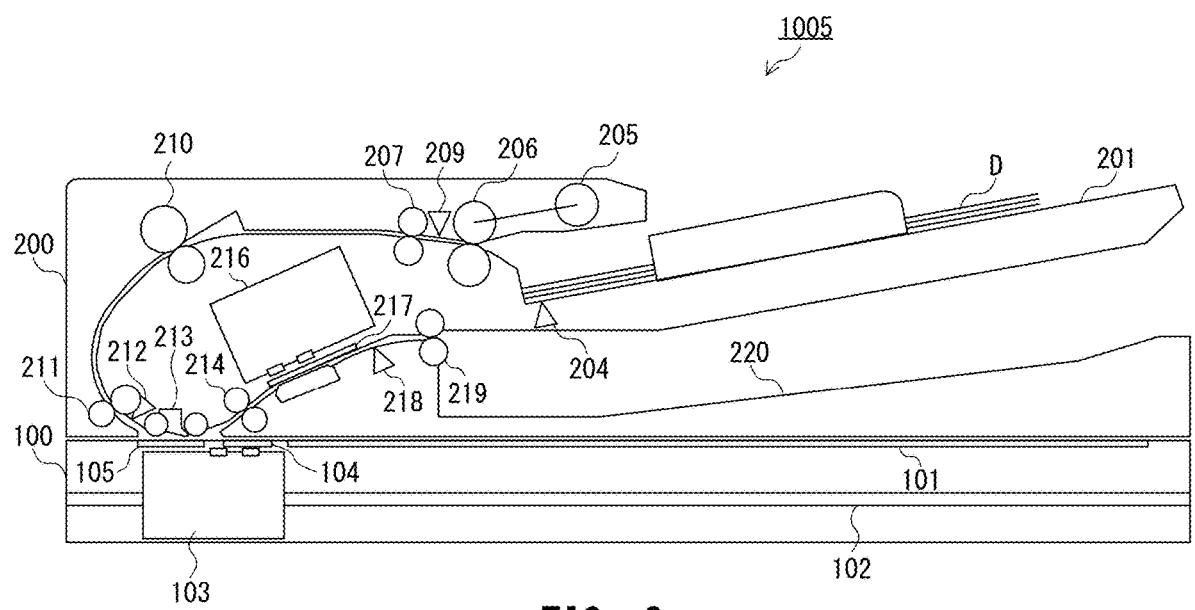
FIG. 3 is a configuration diagram of the image reading apparatus.

FIG. 3 is a configuration diagram of the reader 1005. The scanner 100 includes, on a side on which the ADF 200 is opened and closed, a platen 101, a front-side flow reading glass 105, and a white reference plate 104. The scanner 100 incorporates a front-side reader 103 and a movement guide 102. The front-side reader 103 reads an image on one side (front side) of the original. The front-side reader 103 is movable along the movement guide 102 by an optical motor, which is described later.

In a case where the original D conveyed by the ADF 200 is read, the front-side reader 103 is fixed to a lower portion of the front-side flow reading glass 105, and performs image reading processing by reading the image of the conveyed original D by each line. The processing of reading the original D conveyed by the ADF 200 is referred to as "flow reading." In a case where the original placed on the platen 101 is read, the front-side reader 103 performs the image reading processing by reading the image of the original D by each line while moving along the movement guide 102. The processing of reading the original placed on the platen 101 is referred to as "fixed reading." The white reference plate 104 is read by the front-side reader 103 in a case where shading correction of the front-side reader 103 is performed. The white reference plate 104 is provided between the platen 101 and the front-side flow reading glass 105.

The ADF 200 includes an original tray 201 on which sheet-like originals D are to be stacked. The ADF 200 is a sheet conveying device that conveys an original to a reading position at which the scanner 100 reads an image from the original D. The ADF 200 conveys the original D placed on the original tray 201 to a sheet delivery tray 220 via a conveyance path. A plurality of originals D can be placed on the original tray 201. The original tray 201 includes two guide width restriction plates in a direction (width direction) orthogonal to the conveying direction of the original D. The two guide width restriction plates are movable in the width direction, and sandwich the original D placed on the original tray 201 so as to restrict the movement of the original D in the width direction. In the following description, the terms "upstream" and "downstream" are used with reference to the conveying direction of the original D. The conveyance origin of the original D is the upstream, and the conveyance destination is the downstream.

The ADF 200 can successively convey the originals D one by one to the conveyance path. In the conveyance path, various rollers that convey the original D and various sensors that detect the original D are provided. The conveyance path includes, as a separation mechanism, a separation roller pair 206 and a pickup roller 205. The separation roller pair 206 restricts entry of the original D projecting from the original tray 201 to the downstream before the conveyance is started. On the original tray 201, an original detection sensor 204 for detecting presence or absence of the original D on the original tray 201 is provided.

The pickup roller 205 is dropped onto an uppermost surface of a bundle of the originals D stacked on the original tray 201 and rotated so that the uppermost original D is fed to the conveyance path. The separation roller pair 206 separates and conveys the one uppermost original fed by the pickup roller 205. The separation of the original D is performed by a publicly known separation technology. For example, the separation of the original D is performed by rotating two rollers of the separation roller pair 206 in opposite directions. The pickup roller 205 and the separation roller pair 206 are driven by the same drive source. The separation roller pair 206 conveys the original D to a drawing roller pair 207.

A separation sensor 209 is arranged on the downstream side of the separation roller pair 206. The conveyance of the original D by the drawing roller pair 207 is started based on the timing at which the separation sensor 209 detects a leading edge of the original D, and the rotation of each of the pickup roller 205 and the separation roller pair 206 is stopped. The original D is conveyed in the order of the drawing roller pair 207, a conveyance roller pair 210, and an upstream-of-read roller pair 211. The conveyance roller pair 210 may correct skew feeding of the original D similarly to the registration roller pair 1036. The upstream-of-read roller pair 211 conveys the original D onto the front-side flow reading glass 105.

A read sensor 212 is arranged on the upstream of the front-side flow reading glass 105. In a case where the front side of the original D is read, the front-side reader 103 starts the reading of the original D based on the timing at which the read sensor 212 detects the leading edge of the original D. An original pressing member 213 is provided above the front-side flow reading glass 105. The original D is read by the front-side reader 103 while the original D passes between the front-side flow reading glass 105 and the original pressing member 213. The position of the front-side flow reading glass 105 becomes the reading position of the front-side reader 103.

The original D that has passed through the reading position of the front-side reader 103 is conveyed by a downstream-of-read roller pair 214. A back-side flow reading glass 217 is provided on the downstream of the downstream-of-read roller pair 214. At a position opposed to the conveyance path across the back-side flow reading glass 217, a back-side reader 216 is provided for reading an image on the other side (back side) of the original. In a case where the original D is conveyed between the back-side flow reading glass 217 and the conveyance path by the downstream-of-read roller pair 214, the image on the back side is read by the back-side reader 216. In a case where the back side of the original D is read, the back-side reader 216 starts the reading of the original D based on the timing at which the read sensor 212 detects the leading edge of the original D. The position of the back-side flow reading glass 217 becomes the reading position at the time of reading the back side.

The original D whose image on the back side has been read is delivered to the sheet delivery tray 220 by a delivery roller pair 219. In a case where only the image on the front side is read, the image reading processing by the back-side reader 216 is not performed, and the original D passes through the reading position of the back-side reader 216 to be delivered to the sheet delivery tray 220 after the image reading processing is performed by the front-side reader 103. A sheet delivery sensor 218 is arranged between the back-side flow reading glass 217 and the delivery roller pair 219. In a case where there is no original D on the original tray 201, after the delivery of the original D is finished, the rotation of each roller for conveying the fed original D is stopped based on the timing at which the sheet delivery sensor 218 detects a trailing edge of the original D. That is, the rotation of each of the drawing roller pair 207, the conveyance roller pair 210, the upstream-of-read roller pair 211, the downstream-of-read roller pair 214, and the delivery roller pair 219 is stopped.

The front-side reader 103 and the back-side reader 216 have the same configuration. Each of the front-side reader 103 and the back-side reader 216 includes a light emitting portion, an optical system such as a lens array, and a light receiving portion. In the first embodiment, the light emitting portion is a light emitting diode (LED), and the light receiving portion is a line sensor. The line sensor is achieved by, for example, a contact image sensor (CIS) or a charge coupled device (CCD) formed of a reduction optical system using mirrors. The line sensor is arranged in the width direction of the original. Accordingly, in each of the front-side reader 103 and the back-side reader 216, the width direction of the original corresponds to a main scanning direction, and the conveying direction of the original corresponds to a sub-scanning direction.

The front-side reader 103 applies light by the LED to the original D passing through the front-side flow reading glass 105 (front-side reading position). The light applied from the LED is reflected by the front side of the original D. The reflected light reflected by the front side of the original D is imaged on a light receiving surface of the line sensor by the optical system. The line sensor outputs image data indicating the image on the front side of the original D in accordance with the imaged reflected light. As described above, the front-side reader 103 performs the image reading processing of the front side of the original D.

The back-side reader 216 performs the image reading processing in a case where duplex reading of the original D is set. The back-side reader 216 applies light by the LED to the original D passing through the back-side flow reading glass 217 (back-side reading position). The light applied from the LED is reflected by the back side of the original D. The reflected light reflected by the back side of the original D is imaged on a light receiving surface of the line sensor by the optical system. The line sensor outputs image data indicating the image on the back side of the original D in accordance with the imaged reflected light. As described above, the back-side reader 216 performs the image reading processing of the back side of the original D.

<Controller>

Figure 4:
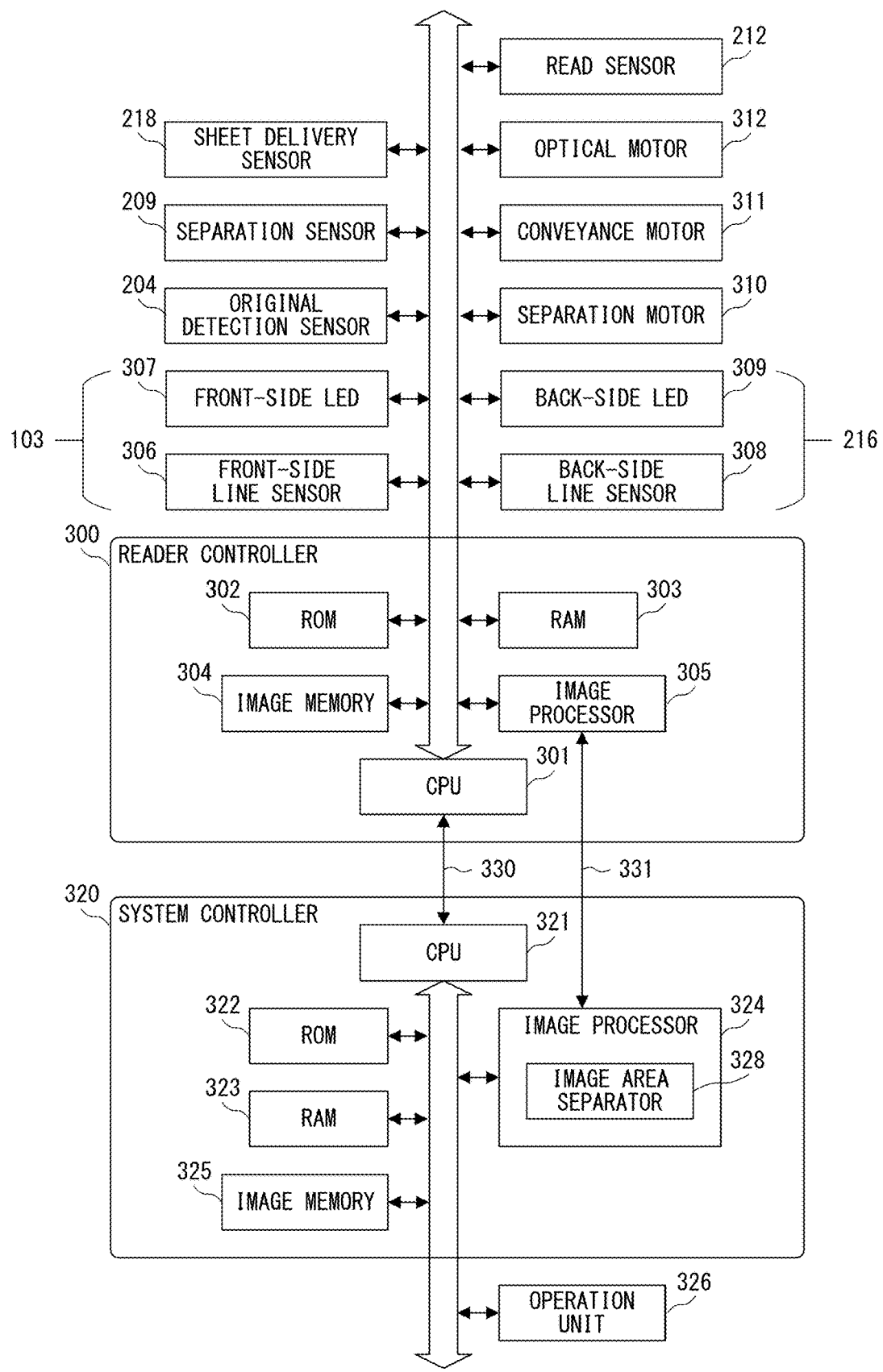
FIG. 4 is a configuration diagram of a controller.

FIG. 4 is a configuration diagram of a controller. The controller includes a reader controller 300 and a system controller 320. The reader controller 300 is provided in the scanner 100. The system controller 320 is provided in the scanner 100 or the printer 1001A (for example, the control unit 1032). The reader controller 300 and the system controller 320 are connected to each other by a command data bus 330 and an image data bus 331 so as to allow communication therebetween.

The reader controller 300 is an information processing device including a central processing unit (CPU) 301, a read only memory (ROM) 302, and a random access memory (RAM) 303. The CPU 301 executes a computer program stored in the ROM 302 so as to control the entire operation of the reader 1005. The RAM 303 provides a work area to be used in a case where the CPU 301 executes processing. An image memory 304 and an image processor 305 are connected to the CPU 301.

Motors, sensors, the front-side reader 103, and the back-side reader 216, which are arranged in the units of the reader 1005, are connected to the CPU 301. The motors include a separation motor 310, a conveyance motor 311, and an optical motor 312. The separation motor 310 is a drive source for feeding the originals D to the conveyance path one by one by driving the pickup roller 205 and the separation roller pair 206 to rotate. The conveyance motor 311 is a drive source for each roller for conveying the original D to the conveyance path, such as the drawing roller pair 207, the conveyance roller pair 210, the upstream-of-read roller pair 211, the downstream-of-read roller pair 214, and the delivery roller pair 219. The optical motor 312 is a drive source for moving the front-side reader 103 along the movement guide 102. The sensors include the original detection sensor 204, the separation sensor 209, the read sensor 212, and the sheet delivery sensor 218. The front-side reader 103 includes a front-side LED 307 serving as the light emitting portion and a front-side line sensor 306 serving as the light receiving portion. The back-side reader 216 includes a back-side LED 309 serving as the light emitting portion and a back-side line sensor 308 serving as the light receiving portion.

The operations of the motors, the sensors, the front-side reader 103, and the back-side reader 216 are as described above. The CPU 301 stores the image data output from each of the front-side line sensor 306 and the back-side line sensor 308 to the image memory 304. The CPU 301 performs various types of image processing on the stored image data by the image processor 305 in accordance with an image output request acquired from the system controller 320 via the command data bus 330, and transmits the image data to the system controller 320 via the image data bus 331. Further, the CPU 301 outputs, as notifications, a vertical synchronization signal serving as a reference of a leading end of the read image and a horizontal synchronization signal serving as a reference of a leading end of pixels in one line of the read image, to the system controller 320 via the image data bus 331 in accordance with the timing at which the original is read.

The system controller 320 is an information processing device including a CPU 321, a ROM 322, a RAM 323, an image processor 324, and an image memory 325. The image processor 324 includes an image area separator 328. The CPU 321 is connected to the CPU 301 of the reader controller 300 so as to allow communication therebetween via the command data bus 330, and performs transmission and reception of data regarding the image reading processing in cooperation with the CPU 301.

The CPU 321 transmits the image output request to the reader controller 300. The CPU 321 performs various types of image processing by the image processor 324 on the image data acquired from the reader controller 300 via the image data bus 331 in accordance with the image output request. The image data subjected to the image processing is stored in the image memory 325. The image area separator 328 performs image area separation processing in a case where the image data subjected to the image processing is stored in the image memory 325.

The image area separation processing is performed as follows. The image area separator 328 detects, from the image indicated by the image data, an area in which a letter is formed (letter area) and an area in which a diagram other than the letter is formed (picture area). The letter area and the picture area are combined to form a content area in which the content of the original D is formed. The image processor 324 performs image processing with respect to the areas in different settings based on the detected content area, thereby being capable of performing appropriate image processing with respect to the content of the image data. The image area separation processing is performed by a publicly known image area separation technology.

The above-mentioned operation unit 326 is connected to the system controller 320. The input interface of the operation unit 326 includes various key buttons, a touch panel, and the like. The output interface of the operation unit 326 includes a display, a speaker, and the like. The user can input various instructions, settings, and the like through the operation unit 326. The system controller 320 can display, on the operation unit 326, screens for giving a notification of the state of the image forming apparatus 1001 or for inputting the various instructions and settings.

Figure 5:
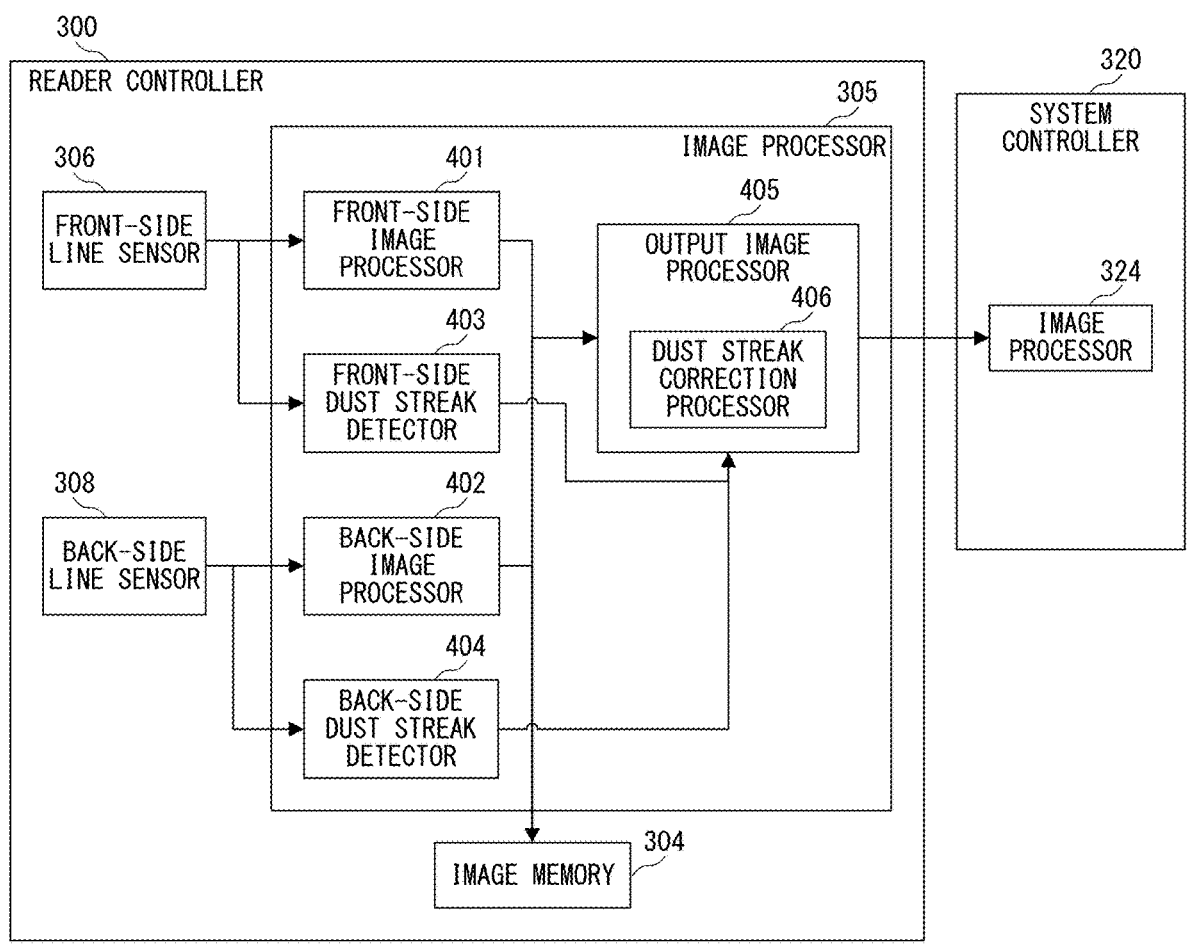
FIG. 5 is an explanatory diagram of a transmission path of image data.

FIG. 5 is an explanatory diagram of a transmission path of image data at the time of performing image processing by the image processor 305 of the reader controller 300. The image processor 305 includes a front-side image processor 401, a front-side dust streak detector 403, a back-side image processor 402, a back-side dust streak detector 404, and an output image processor 405. The image data output from the front-side line sensor 306 is subjected to image processing, such as conversion from an output format of the front-side line sensor 306 into image data, for each line by the front-side image processor 401, and is then stored into the image memory 304. The image data output from the back-side line sensor 308 is subjected to image processing, such as conversion from an output format of the back-side line sensor 308 into image data, for each line by the back-side image processor 402, and is then stored into the image memory 304.

In parallel to the image processing performed by the front-side image processor 401, the front-side dust streak detector 403 performs dust streak detection processing of detecting a dust streak from the image data output from the front-side line sensor 306. Similarly, the back-side dust streak detector 404 performs, in parallel to the image processing performed by the back-side image processor 402, dust streak detection processing of detecting a dust streak from the image data output from the back-side line sensor 308. The dust streak is a streak-like image which is generated in the read image and extends in the conveying direction of the original (sub-scanning direction) in a case where a foreign matter such as dust present at the reading position is read together with the original at the time of the image reading processing. The dust streak detection processing is performed by a publicly known technology as disclosed in, for example, Japanese Patent Application Laid-open No. 2005-117090. For example, a luminance value of each pixel is acquired from the image data, and in a case where a pixel having a luminance value extremely different from that of an adjacent pixel continues for a predetermined number of pixels or more in one predetermined direction, those pixels are detected as a dust streak.

<Dust Streak Detection>

FIG. 6A and FIG. 6B are explanatory diagrams of dust streaks detected by the dust streak detection processing. FIG. 6A shows an image of an original D to be read. FIG. 6B shows a read image in a case in which dust streaks are generated. FIG. 6B shows a state in which dust streaks $G_1$ to $G_4$ are generated on the read image of the original D.

FIG. 7 is an explanatory diagram of dust streak position information (dust position information) detected by the dust streak detection processing to be performed in each of the front-side dust streak detector 403 and the back-side dust streak detector 404. With the dust streak detection processing, a start position ($P_{nSX}$, $P_{nSY}$), an end position ($P_{nEX}$, $P_{nEY}$), and a dust width ($W_n$) on the read image of each dust streak $G_n$ (n is an integer) are detected as the dust position information. The detected dust position information is stored in a memory in the front-side dust streak detector 403 or the back-side dust streak detector 404 which has performed the dust streak detection processing. The CPU 301 can refer to the dust position information after the dust streak detection processing is ended.

The image processor 305 extracts the image data from the image memory 304 for each original in a case where the image data is transferred to the image processor 324 of the system controller 320 in response to the instruction from the CPU 301. The image processor 305 performs image processing including dust streak correction processing on the acquired image data by the output image processor 405, and then outputs the image data to the image processor 324.

A dust streak correction processor 406 corrects the dust streak with reference to the detection result (dust position information) obtained through the dust streak detection processing. This dust streak correction processing is implemented by a publicly known dust streak correction technology as disclosed in, for example, Japanese Patent Application Laid-open No. 2005-117090. For example, the dust streak is corrected by setting, for a pixel determined as the dust streak, a luminance value that is based on a luminance value of an adjacent pixel.

Figure 8:
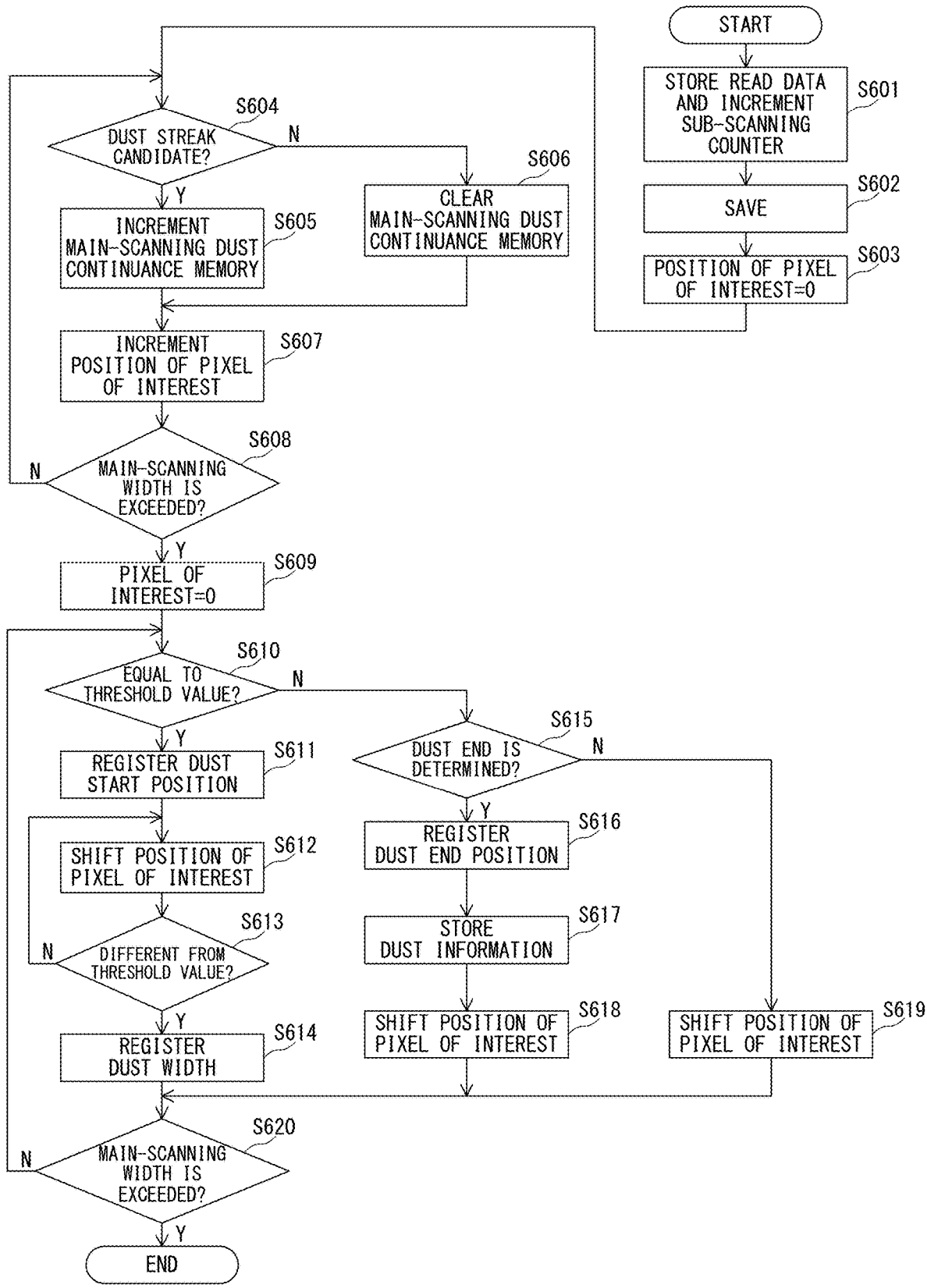
FIG. 8 is a flow chart for illustrating dust streak detection processing.
Figure 9:
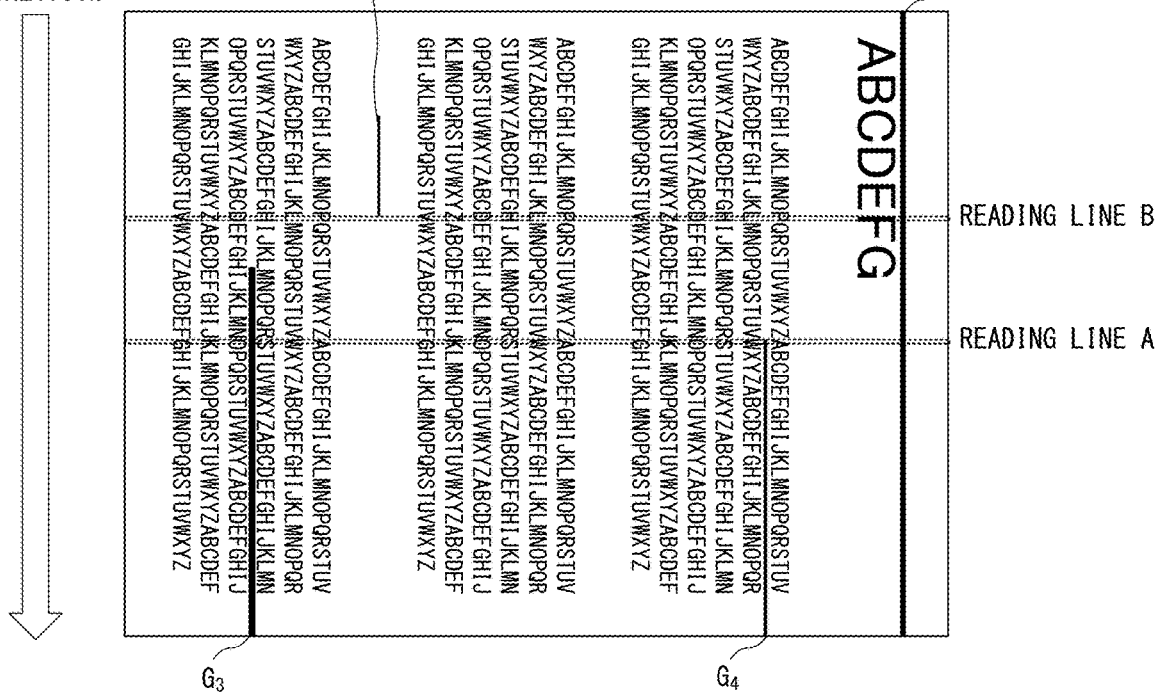
FIG. 9 is an exemplary diagram of a read image.
Figure 10A:
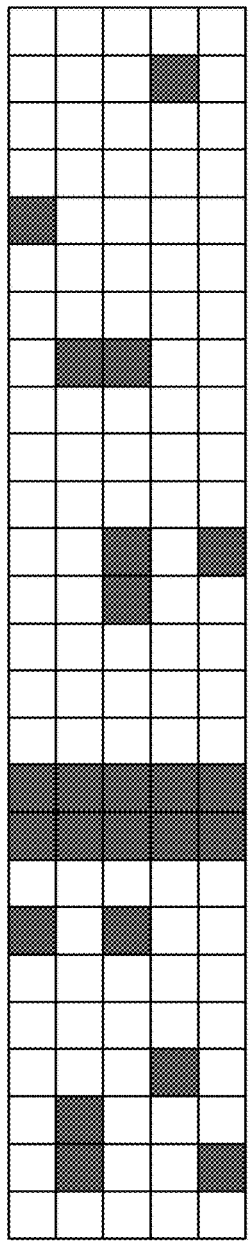
Figure 11B:
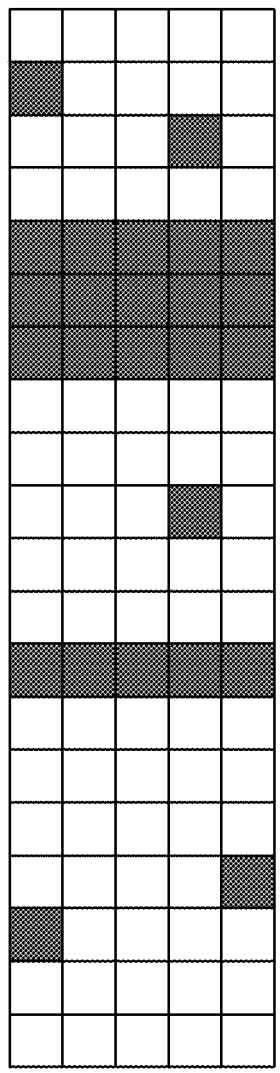

FIG. 8 is a flow chart for illustrating the dust streak detection processing. This processing is performed by one or both of the front-side dust streak detector 403 and the back-side dust streak detector 404 every time one or both of the front-side line sensor 306 and the back-side line sensor 308 read an image corresponding to one line. FIG. 9 is an exemplary diagram of the read image, and shows a position of a reading line subjected to the dust streak detection processing. FIGS. 10A, 10B and FIGS. 11A and 11B are each an explanatory diagram of a memory configuration in each of the front-side dust streak detector 403 and the back-side dust streak detector 404. FIGS. 10A and 10B show data at the time of performing dust streak detection processing at a reading line A of FIG. 9. FIGS. 11A and 11B show data at the time of performing dust streak detection processing at a reading line B of FIG. 9.

As illustrated in FIGS. 10A, 10B and FIGS. 11A, 11B, each of the front-side dust streak detector 403 and the back-side dust streak detector 404 includes a sub-scanning counter, a read image buffer, a main-scanning dust continuance memory, a previous-line main-scanning dust continuance memory, and a final dust position information memory. Here, processing of the front-side dust streak detector 403 is described, but the back-side dust streak detector 404 performs similar processing.

The front-side dust streak detector 403 starts the dust streak detection processing after acquiring the image data corresponding to one line from the front-side line sensor 306. In a case where the dust streak detection processing is started, the front-side dust streak detector 403 stores the image data (read data) corresponding to one line into the read image buffer, and increments the sub-scanning counter (Step S601). The front-side dust streak detector 403 saves the value of the main-scanning dust continuance memory to the previous-line main-scanning dust continuance memory (Step S602). The front-side dust streak detector 403 sets a position of a pixel of interest to "0" (Step S603), and performs dust streak continuous length measurement processing on a dust streak detection line at the middle of the read image buffer.

In the dust streak continuous length measurement processing, the front-side dust streak detector 403 compares the pixel of interest on the read image buffer with its surrounding pixel to determine whether or not the pixel of interest is a dust streak candidate (Step S604). The determination of the dust streak candidate is performed by a publicly known method using a correlation with the surrounding pixel, as described in, for example, Japanese Patent Application Laid-open No. 2005-117090. In a case where the pixel of interest is the dust streak candidate (Step S604: Y), the front-side dust streak detector 403 increments the number of continuous pixels corresponding to the pixel of interest of the main-scanning dust continuance memory (Step S605). In a case where the pixel of interest is not the dust streak candidate (Step S604: N), the front-side dust streak detector 403 clears the number of continuous pixels corresponding to the pixel of interest of the main-scanning dust continuance memory to "0" (Step S606).

After the front-side dust streak detector 403 updates the value of the main-scanning dust continuance memory based on a dust streak determination result of the pixel of interest, the front-side dust streak detector 403 increments the position of the pixel of interest to shift the position of the pixel of interest by one pixel (Step S607). The front-side dust streak detector 403 checks whether the position of the pixel of interest exceeds a main-scanning width (Step S608). In a case where the main-scanning width is not exceeded (Step S608: N), the front-side dust streak detector 403 performs determination of the dust streak candidate for the next pixel of interest (Step S604). In a case where the position of the pixel of interest exceeds the main-scanning width (Step S608: Y), the front-side dust streak detector 403 clears the position of the pixel of interest to "0" (Step S609), and starts the dust streak determination processing.

The front-side dust streak detector 403 first checks the value of the main-scanning dust continuance memory of the pixel of interest, and checks whether or not the number of continuous pixels is equal to a predetermined threshold value K (Step S610). With reference to the reading line A of FIG. 9 as an example, processing in a case in which the dust start is determined and processing in a case in which the dust end is determined are described. The reading line A is a reading line used in a case where a leading end of a dust streak $G_4$ is detected. FIGS. 10A and 10B exemplify data on the memory of the front-side dust streak detector 403 at the reading line A. Further, in the first embodiment, the threshold value K is set to K=5.

In the pixel of interest X=34 of the reading line A, the number of continuous pixels of the main-scanning dust continuance memory is equal to the threshold value K=5 (Step S610: Y), and hence the front-side dust streak detector 403 registers the dust start position (Step S611). The dust start position is indicated through use of the position of the pixel of interest X=34 as the dust start main-scanning position $P_{nSX}$ and a value obtained by subtracting the threshold value K from the number of continuous pixels (in the first embodiment, 300−5=295) as the dust start sub-scanning position $P_{nSY}$. The dust start position is stored in a dust position information temporary memory corresponding to the pixel of interest of the main-scanning dust continuance memory.

In order to determine the dust streak width, the front-side dust streak detector 403 shifts the position of the pixel of interest by one pixel (X=35), and re-checks the value of the main-scanning dust continuance memory of the pixel of interest to check whether or not the number of continuous pixels is equal to the threshold value K (Step S613). In a case where the number of continuous pixels of the pixel of interest is equal to the threshold value K (Step S613: N), the front-side dust streak detector 403 repeats the processing of shifting the position of the pixel of interest by one pixel (Step S612) until the pixel of interest and the number of continuous pixels of the main-scanning dust continuance memory do not match each other.

In a case where the number of continuous pixels of the main-scanning dust continuance memory of the pixel of interest and the threshold value K are not equal to each other (Step S613: Y), the front-side dust streak detector 403 acquires, as the dust width $W_n$, a difference between the position of the pixel of interest at this time and the position of the pixel of interest at the time in a case where the dust start position is registered. The front-side dust streak detector 403 stores (registers) this dust width $W_n$ into the dust position information temporary memory corresponding to the pixel of interest of the main-scanning dust continuance memory (Step S614). In the first embodiment, at the time point of the pixel of interest X=35, the number of continuous pixels on the main-scanning dust continuance memory of the pixel of interest X=35 is not 5, and hence the dust width $W_n$ is 35−34=1.

After that, the front-side dust streak detector 403 checks whether the position of the pixel of interest exceeds the main-scanning width (Step S620). In a case where the main-scanning width is not exceeded (Step S620: N), the front-side dust streak detector 403 returns to the process step of Step S610, and re-checks the value of the main-scanning dust continuance memory of the pixel of interest to check whether or not the number of continuous pixels is equal to the threshold value K. In a case where the main-scanning width is exceeded (Step S620: Y), the front-side dust streak detector 403 ends the dust streak detection, and waits until the next line is read.

In a case where the value of the main-scanning dust continuance memory of the pixel of interest is different from the threshold value K (Step S610: N), the front-side dust streak detector 403 performs dust end determination (Step S615). The front-side dust streak detector 403 determines as dust end when, through the dust end determination, the value of the pixel of interest of the previous-line main-scanning dust continuance memory is equal to or larger than the threshold value K and the value of the pixel of interest of the main-scanning dust continuance memory is "0". With reference to the reading line B of FIG. 9 as an example, the processing in the case in which the dust end is determined is described. The reading line B is a reading line used in a case where a trailing end of a dust streak $G_2$ is detected. FIGS. 11A and 11B exemplify data on the memory of the front-side dust streak detector 403 at the reading line B.

The pixel of interest X=15 of the reading line B is determined as the dust streak end position because the value of the pixel of interest of the previous-line main-scanning dust continuance memory is equal to or larger than the threshold value K=5 and the value of the pixel of interest of the main-scanning dust continuance memory is "0" (Step S615: Y). Accordingly, the front-side dust streak detector 403 registers the dust streak end position (Step S616). The dust streak end position is stored into the dust position information temporary memory corresponding to the pixel of interest of the main-scanning dust continuance memory through use of the position of the pixel of interest X=5 at this time as $P_{nEX}$ and the number of sub-scanning continuous pixels Y=200 as PREY.

The front-side dust streak detector 403 registers the content of the dust position information temporary memory corresponding to the pixel of interest of the main-scanning dust continuance memory into the final dust position information memory (Step S617). The front-side dust streak detector 403 shifts the position of the pixel of interest by one pixel (Step S618), and checks whether the position of the pixel of interest exceeds the main-scanning width (Step S620). In a case where the main-scanning width is not exceeded (Step S620: N), the front-side dust streak detector 403 returns to the process step of Step S610, and re-checks the value of the main-scanning dust continuance memory of the pixel of interest to check whether or not the number of continuous pixels is equal to the threshold value K. In a case where the main-scanning width is exceeded (Step S620: Y), the front-side dust streak detector 403 ends the dust streak detection, and waits until the next line is read.

In a case where the value of the main-scanning dust continuance memory of the pixel of interest is different from the threshold value K and it is determined as not the dust end (Step S610: N, Step S615: N), the front-side dust streak detector 403 shifts the position of the pixel of interest by one pixel (Step S619). The front-side dust streak detector 403 checks whether the position of the pixel of interest exceeds the main-scanning width (Step S620). In a case where the main-scanning width is not exceeded (Step S620: N), the front-side dust streak detector 403 returns to the process step of Step S610, and re-checks the value of the main-scanning dust continuance memory of the pixel of interest to check whether or not the number of continuous pixels is equal to the threshold value K. In a case where the main-scanning width is exceeded (Step S620: Y), the front-side dust streak detector 403 ends the dust streak detection, and waits until the next line is read.

With the processing described above, abnormal pixels continuing for a predetermined number of pixels or more in the sub-scanning direction on the read image can be detected as the dust streak (abnormal image) caused by dust. Further, the dust streak position information can be acquired.

<Flow Reading Processing>

Figure 12:
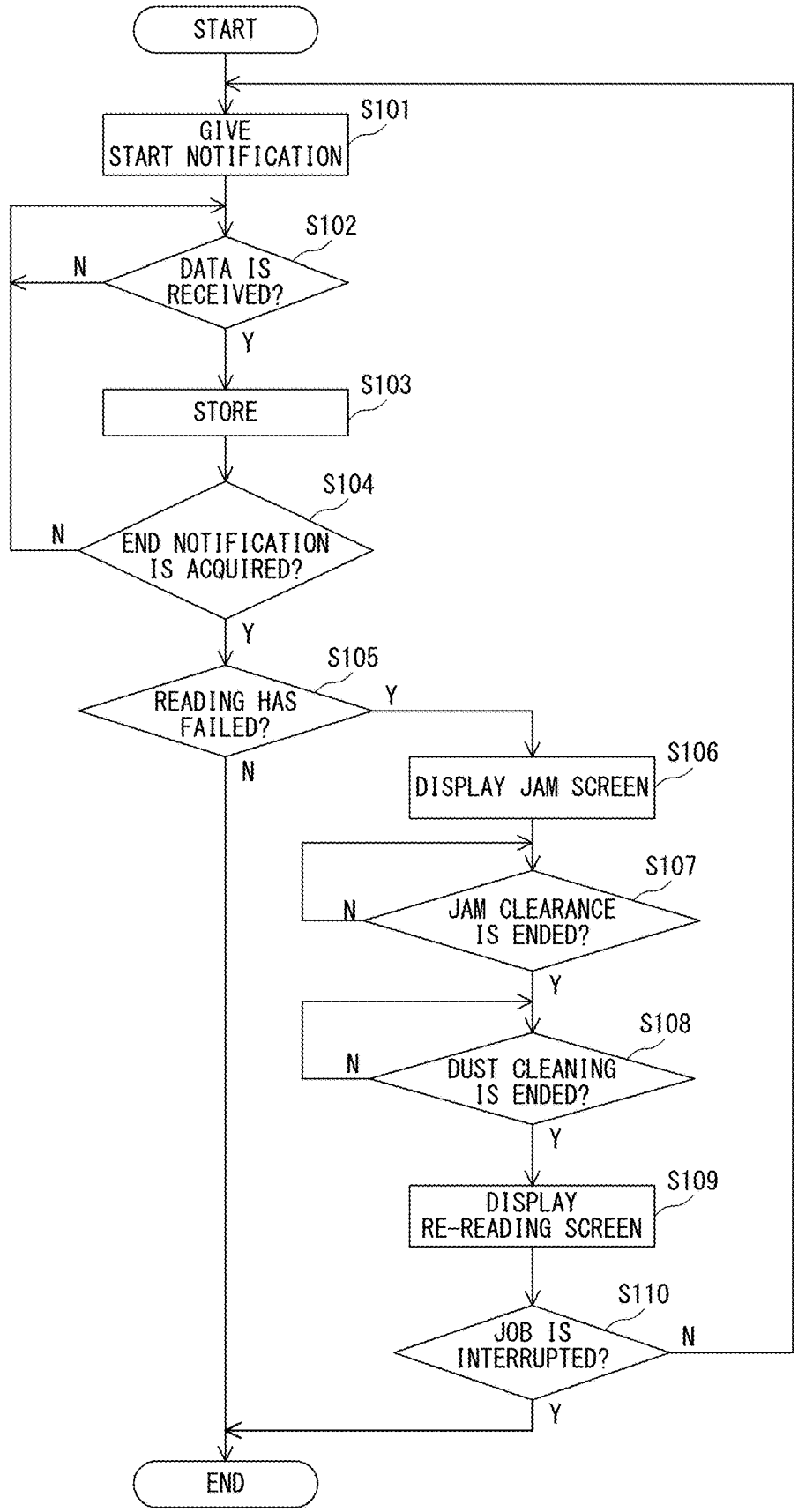
FIG. 12 is a flow chart for illustrating flow reading processing.
Figure 13:
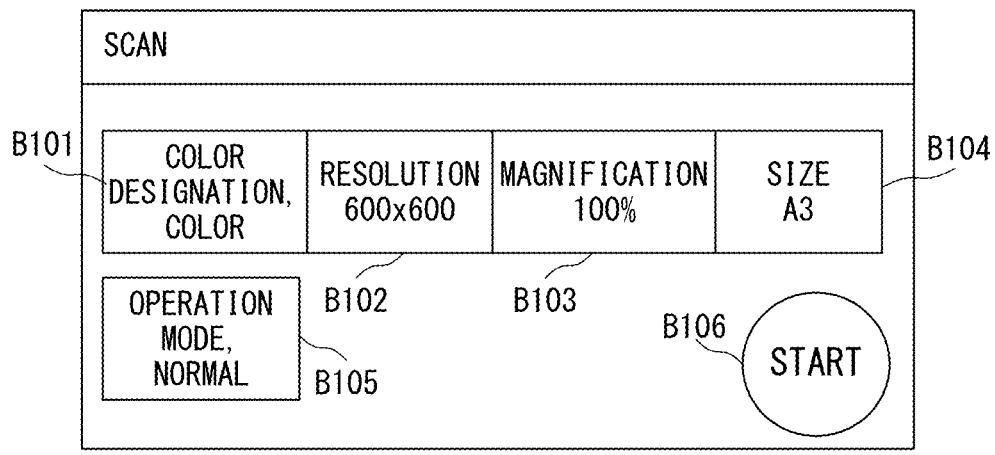
FIG. 13 is an exemplary view of a job input screen.
Figure 14:
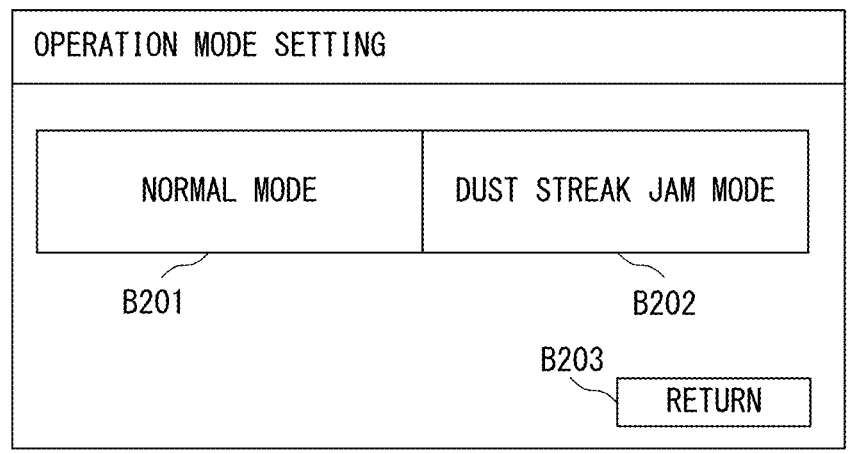
FIG. 14 is an exemplary view of an operation mode setting screen.
Figure 15:
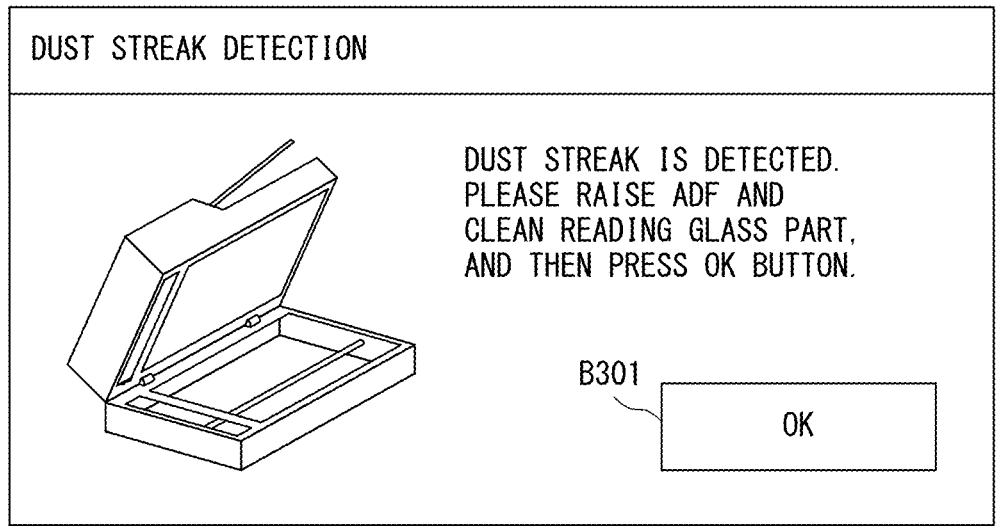
FIG. 15 is an exemplary view of a jam notification screen.
Figure 16:
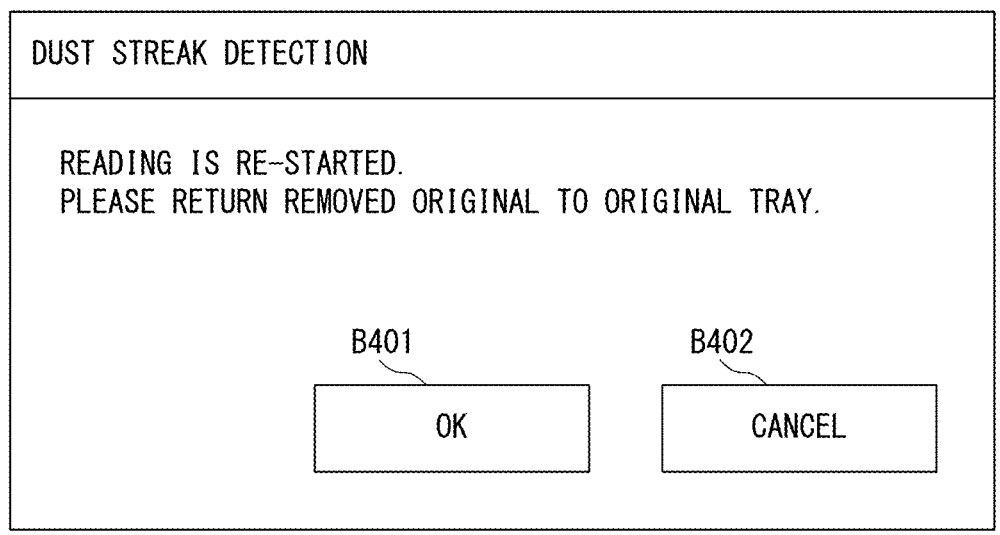
FIG. 16 is an exemplary view of a re-reading screen.

FIG. 12 is a flow chart for illustrating the flow reading processing of the original D using the ADF 200 in the first embodiment. This processing is executed by the system controller 320 (CPU 321). FIG. 13, FIG. 14, FIG. 15, and FIG. 16 are exemplary views of screens to be displayed on a display of the operation unit 326 in a case where the flow reading processing is performed. FIG. 13 exemplifies a job input screen to be displayed on the operation unit 326 before the job is started. FIG. 14 exemplifies an operation mode setting screen. FIG. 15 exemplifies a jam notification screen to be displayed in a case where dust detection jam occurs. FIG. 16 exemplifies a re-reading screen to be displayed after jam processing.

Before the flow reading processing is started, the operation unit 326 displays the job input screen of FIG. 13. In the job input screen, an operation mode designation button B105 is displayed in addition to buttons for performing settings required for reading, such as a reading color designation button B101, a resolution designation button B102, a magnification designation button B103, and an original size designation button B104. The user can press each button to perform the settings required for reading the original.

For example, in a case where the operation mode designation button B105 is pressed, the operation mode setting screen illustrated in FIG. 14 is displayed. In the operation mode setting screen, a normal mode or a dust streak jam mode is selectable as an operation mode. The normal mode is an operation mode of continuing the image reading after correcting the abnormal image. The dust streak jam mode is an operation mode of interrupting the image reading without correcting the abnormal image. The user can select any one of a normal mode button B201 or a dust streak jam mode button B202 to set the operation mode. After the operation mode is set, a return button B203 is pressed so that the display of the operation unit 326 returns to the job input screen illustrated in FIG. 13. After the setting of the operation mode is ended, the user can press a start button B106 of FIG. 13 to start the flow reading processing.

In a case where the CPU 321 of the system controller 320 is instructed to perform flow reading of the original by the operation unit 326, the CPU 321 of the system controller 320 notifies the CPU 301 of the reader controller 300 of the start of the flow reading processing (Step S101). At this time, the CPU 321 notifies the CPU 301 of the operation mode set by the user in addition to the settings required for reading, such as the reading color designation, the resolution, the magnification, and the original size, which are set by the user through the operation unit 326.

The CPU 321 checks an image data reception state of the image processor 324, and waits until the image data is transferred from the image processor 305 of the reader controller 300 (Step S102: N). In a case where the transfer of the image data is started (Step S102: Y), the CPU 321 stores the image data as an image file into the RAM 323 (Step S103).

After the image file is stored, the CPU 321 checks whether or not a job end notification is acquired from the CPU 301 of the reader controller 300 (Step S104). In a case where no job end notification is acquired (Step S104: N), the CPU 321 returns to the process step of Step S102, and waits for the reception of the image data. In a case where the job end notification is acquired (Step S104: Y), the CPU 321 checks the reading result (Step S105). In a case where the reading has succeeded (Step S105: N), the CPU 321 ends the flow reading processing.

In a case where the reading has failed (Step S105: Y), the CPU 321 displays the jam notification screen exemplified in FIG. 15 on the operation unit 326 to urge the user to clean the flow reading glass 105 and 217 (Step S106). After that, the CPU 321 waits for a jam clearance notification to be transmitted from the CPU 301 of the reader controller 300 (Step S107: N). Although the details are described later, in a case where the CPU 301 of the reader controller 300 confirms that all of the originals D remaining in the ADF 200 have been removed, the CPU 301 of the reader controller 300 gives the jam clearance notification to the CPU 321.

In a case where the jam clearance notification is acquired (Step S107: Y), the CPU 321 waits until an OK button B301 of the jam notification screen is pressed (Step S108: N). In a case where the user cleans the flow reading glass 105 and 217 and it is detected that the OK button B301 of the jam notification screen has been pressed (Step S108: Y), the CPU 321 displays the re-reading screen exemplified in FIG. 16 to urge the user to restart the job (Step S109).

The CPU 321 checks which of a cancel button B402 or an OK button B401 of the re-reading screen is pressed by the user through the operation unit 326 (Step S110). In a case where the cancel button B402 is pressed (Step S110: Y), the CPU 321 ends the flow reading processing. In a case where the OK button B401 is pressed (Step S110: N), the CPU 321 returns to the process step of Step S101, and re-notifies the CPU 301 of the reader controller 300 of the start of the flow reading processing.

Figure 17:
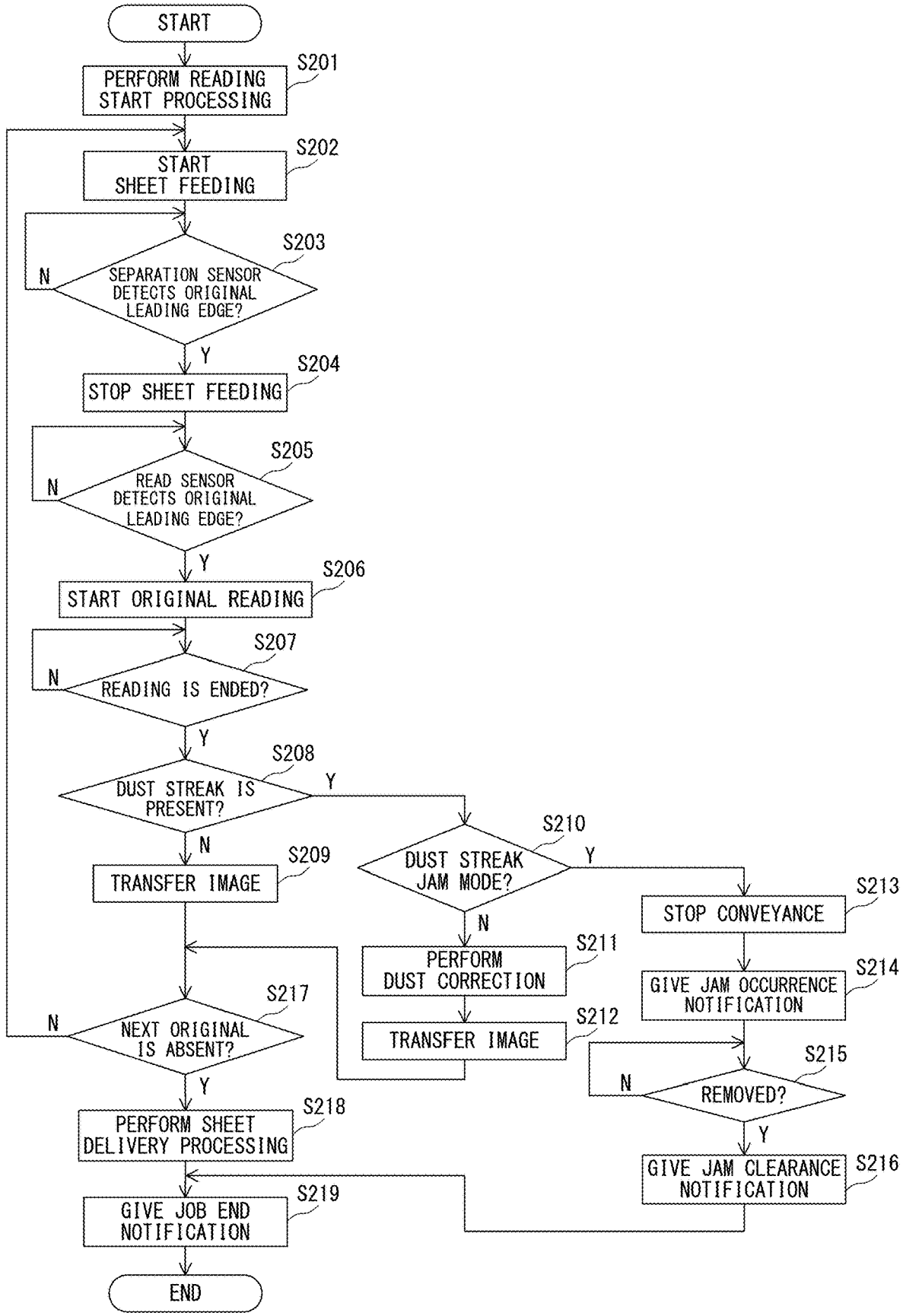
FIG. 17 is a flow chart for illustrating the flow reading processing.

FIG. 17 is a flow chart for illustrating the flow reading processing of the original D using the ADF 200 in the first embodiment. This processing is executed by the reader controller 300 (CPU 301).

In a case where the CPU 301 acquires the notification of the start of the flow reading processing from the CPU 321 of the system controller 320, the CPU 301 sets the reading resolution and the color mode to the reader (front-side reader 103 and back-side reader 216), and performs reading preparation processing such as shading processing (Step S201). The CPU 301 starts the drive of each of the separation motor 310 and the conveyance motor 311 to start the feeding of the original D (Step S202). Through the drive of the separation motor 310, the pickup roller 205 is lowered to the original surface while being rotated, and the separation roller pair 206 is rotated. Thus, the original D is fed.

The CPU 301 waits until the leading edge of the original D is detected by the separation sensor 209 (Step S203: N). In a case where the separation sensor 209 detects the leading edge of the original D (Step S203: Y), the CPU 301 stops the separation motor 310 to finish the sheet feeding control (Step S204). After the sheet feeding control is finished, the CPU 301 starts the reading processing. In a case where the reading processing is started, the CPU 301 waits until the read sensor 212 detects the leading edge of the original D (Step S205: N). In a case where the read sensor 212 detects the leading edge of the original D (Step S205: Y), the CPU 301 starts to read the original by the front-side reader 103 and the back-side reader 216 (Step S206).

The CPU 301 waits for the notification of the reading end from the image processor 305 (Step S207: N). After the reading is ended (Step S207: Y), the CPU 301 checks the presence or absence of the dust streak on the read image (Step S208).

In a case where the dust streak is present (Step S208: Y), the CPU 301 checks the operation mode designated from the CPU 321 of the system controller 320 (Step S210). In a case where the operation mode is the dust streak jam mode (Step S210: Y), the CPU 301 stops the conveyance motor 311 to stop the conveyance of the original D (Step S213), and notifies the CPU 321 of the system controller 320 of the occurrence of the dust streak jam (Step S214).

After that, the CPU 301 waits until the user removes all of the originals D in the conveyance path based on the detection results of the sensors (separation sensor 209, read sensor 212, and sheet delivery sensor 218) on the conveyance path (Step S215: N). When it is confirmed that all of the originals D have been removed (Step S215: Y), the CPU 301 transmits the jam clearance notification to the system controller 320 (Step S216).

In a case where the dust streak is present and the normal mode is designated from the CPU 321 of the system controller 320 (Step S208: Y, Step S210: N), the CPU 301 enables the dust correction processing (Step S211), and performs image transfer processing (Step S212). With this, the image processor 305 of the reader controller 300 transmits the image data subjected to the predetermined image processing and dust streak correction to the image processor 324 of the system controller 320.

In a case where the dust streak is absent (Step S208: N), the CPU 301 performs image transfer processing of transferring the read image to the image processor 324 of the system controller 320 (Step S209). In this manner, the image processor 305 of the reader controller 300 transmits the image data subjected to the predetermined image processing to the image processor 324 of the system controller 320. After the image transfer processing of Step S209 or Step S212 is executed, the CPU 301 checks the original detection sensor 204 (Step S217). In a case where a next original is present (Step S217: N), the CPU 301 returns to the process step of Step S202, and drives the separation motor 310 to start the feeding of the next original.

In a case where the next original is absent (Step S217: Y), as sheet delivery processing, the CPU 301 drives the conveyance motor 311 by such an amount that the original D is moved by a predetermined distance, and then stops the conveyance motor 311 (Step S218). The CPU 301 notifies the CPU 321 of the system controller 320 of the reading end (Step S219), and ends the flow reading processing.

As described above, for example, at the time of electronic documentation processing, in a case where the dust streak is generated and thus the readability and the integrity of the original D cannot be ensured, the reader 1005 immediately stops the reading and notifies the user of the failure of the reading. In this manner, the user can be notified of the original D that does not satisfy legal requirements regarding the electronic documentation. Further, the determination is made during the reading and the user is notified of the determination. Thus, as compared to a case in which the user checks the failed original after all of the originals D are read, the user can check the failed original in a shorter procedure.

Second Embodiment

A configuration of an image forming apparatus 1001 according to a second embodiment of the present disclosure is similar to that in the first embodiment. Further, the image forming apparatus 1001 in the second embodiment also includes a controller similar to that in the first embodiment. Description of the image forming apparatus 1001 and the controller is thus omitted.

<Flow Reading Processing>

Figure 18:
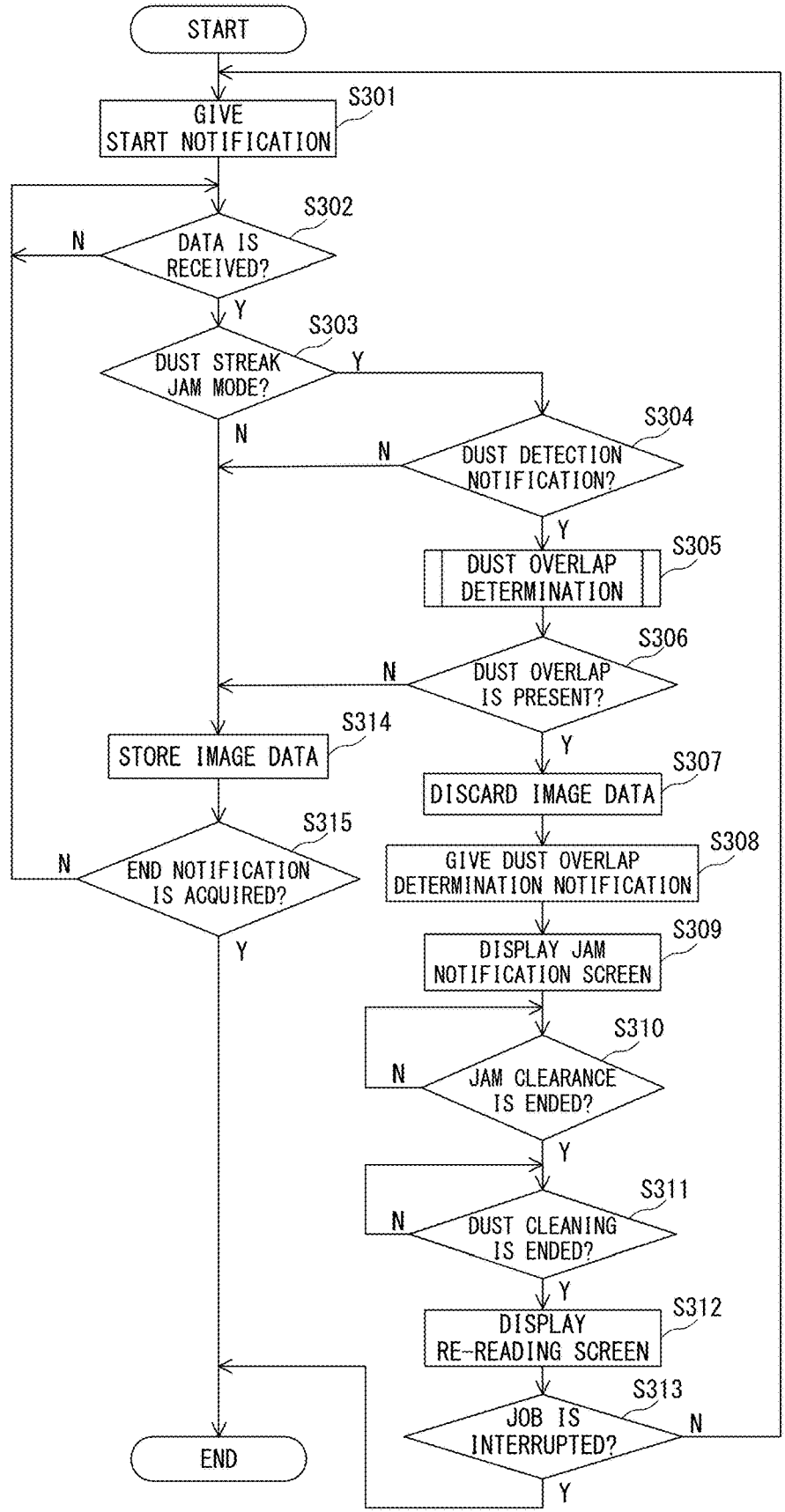
FIG. 18 is a flow chart for illustrating the flow reading processing.
Figure 19:
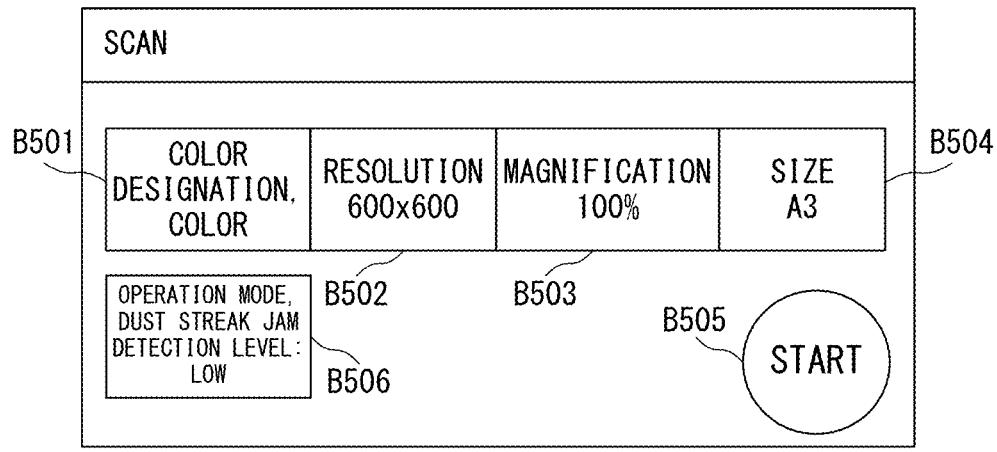
FIG. 19 is an exemplary view of a job input screen.
Figure 20:
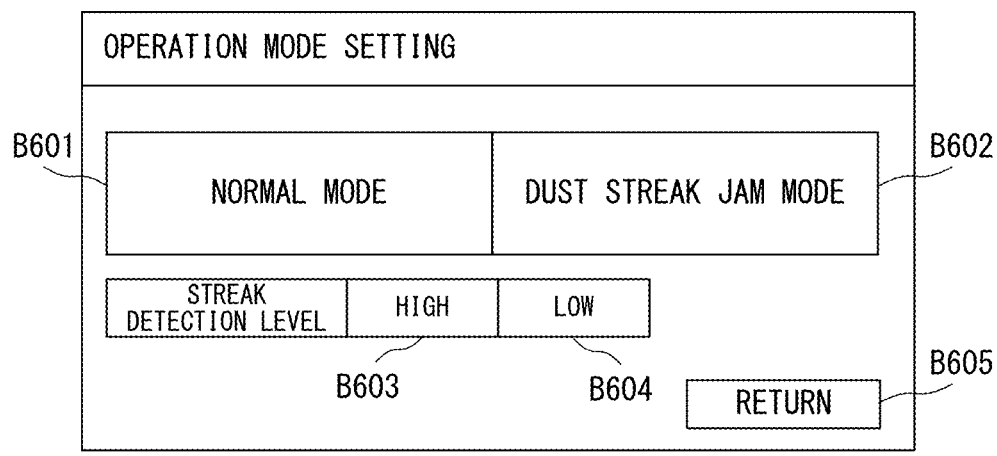
FIG. 20 is an exemplary view of an operation mode setting screen.

FIG. 18 is a flow chart for illustrating the flow reading processing of the original D using the ADF 200 in the second embodiment. This processing is executed by the system controller 320 (CPU 321). FIG. 19 and FIG. 20 are exemplary views of screens to be displayed on the display of the operation unit 326 in a case where the flow reading processing is performed. FIG. 19 exemplifies a job input screen to be displayed on the operation unit 326 before the job is started. FIG. 20 exemplifies an operation mode setting screen.

Before the flow reading processing is started, the job input screen of FIG. 19 is displayed on the operation unit 326. In the job input screen, an operation mode designation button B506 is displayed in addition to buttons for performing settings required for reading, such as a reading color designation button B501, a resolution designation button B502, a magnification designation button B503, and an original size designation button B504. The user can press each button to perform the settings required for the reading of the original.

For example, in a case where the operation mode designation button B506 is pressed, the operation mode setting screen illustrated in FIG. 20 is displayed. In the operation mode setting screen, a normal mode or a dust streak jam mode is selectable as the operation mode. The user can select any one of a normal mode button B601 or a dust streak jam mode B602 to set the operation mode. In a case where the dust streak jam mode is set, with selection buttons B603 and B604, a streak detection level can be set. After the operation mode is selected, a return button B605 is pressed so that the display of the operation unit 326 returns to the job input screen illustrated in FIG. 19. After the setting of the operation mode is ended, the user can press a start button B505 of FIG. 19 to start the flow reading processing.

In a case where the CPU 321 of the system controller 320 is instructed to perform flow reading of the original by the operation unit 326, the CPU 321 of the system controller 320 notifies the CPU 301 of the reader controller 300 of the start of the flow reading processing (Step S301). At this time, the CPU 321 notifies the CPU 301 of the operation mode selected by the user in addition to the settings required for reading, such as the reading color designation, the resolution, the magnification, and the original size, which are set by the user through the operation unit 326.

The CPU 321 checks an image data reception state of the image processor 324, and waits until the image data is transferred from the image processor 305 of the reader controller 300 (Step S302: N). In a case where the transfer of the image data is started (Step S302: Y), the CPU 321 checks the operation mode set by the user (Step S303).

In a case where the operation mode is the dust streak jam mode (Step S303: Y), the CPU 321 checks whether or not a dust detection notification is acquired from the CPU 301 of the reader controller 300 (Step S304). Although the details are described later, in a case where the CPU 301 of the reader controller 300 detects the dust streak in the read image, the CPU 301 of the reader controller 300 gives a dust detection notification including the dust position information to the CPU 321. In a case where the dust detection notification is acquired (Step S304: Y), the CPU 321 performs dust overlap determination processing, which is described later (Step S305). The dust overlap determination processing is performed based on the streak detection level set by the user, the dust position information acquired from the CPU 301 of the reader controller 300, and the content area detection result obtained by the image area separator 328. With the dust overlap determination processing, it is determined whether or not an abnormal image area (dust streak area) in which the dust streak is generated and an area (content area) of an image of the original overlap each other.

After the dust overlap determination processing is ended, the CPU 321 checks a dust overlap determination result (Step S306). When it is determined that dust overlap is present (Step S306: Y), the CPU 321 discards the acquired image data without storing the image data as an image file (Step S307), and notifies the CPU 301 of the reader controller 300 of the dust overlap presence determination (Step S308). The CPU 321 displays the jam notification screen exemplified in FIG. 15 on the operation unit 326 to urge the user to clean the flow reading glass 105 and 217 (Step S309). After that, similarly to the process steps of Step S107 to Step S109 of FIG. 12, after the jam clearance and the dust cleaning are ended, the CPU 321 displays the re-reading screen exemplified in FIG. 16 (Step S310 to Step S312). In a case where the cancel button B402 of the re-reading screen is pressed (Step S313: Y), the CPU 321 ends the flow reading processing. In a case where the OK button B401 is pressed (Step S313: N), the CPU 321 returns to the process step of Step S301, and re-notifies the CPU 301 of the reader controller 300 of the start of the flow reading processing.

In a case where the operation mode is not the dust streak jam mode (Step S303: N), when no dust detection notification is acquired (Step S304: N), or when it is determined that the dust overlap is absent (Step S306: N), the CPU 321 stores the image data into the RAM 323 (Step S314). The image data is stored into the RAM 323 as an image file.

After the image file is stored, the CPU 321 checks whether or not a job end notification is acquired from the CPU 301 of the reader controller 300 (Step S315). In a case where no job end notification is acquired (Step S315: N), the CPU 321 returns to the process step of Step S302, and waits for the reception of the image data. In a case where the job end notification is acquired (Step S315: Y), the CPU 321 ends the flow reading processing.

Figure 21:
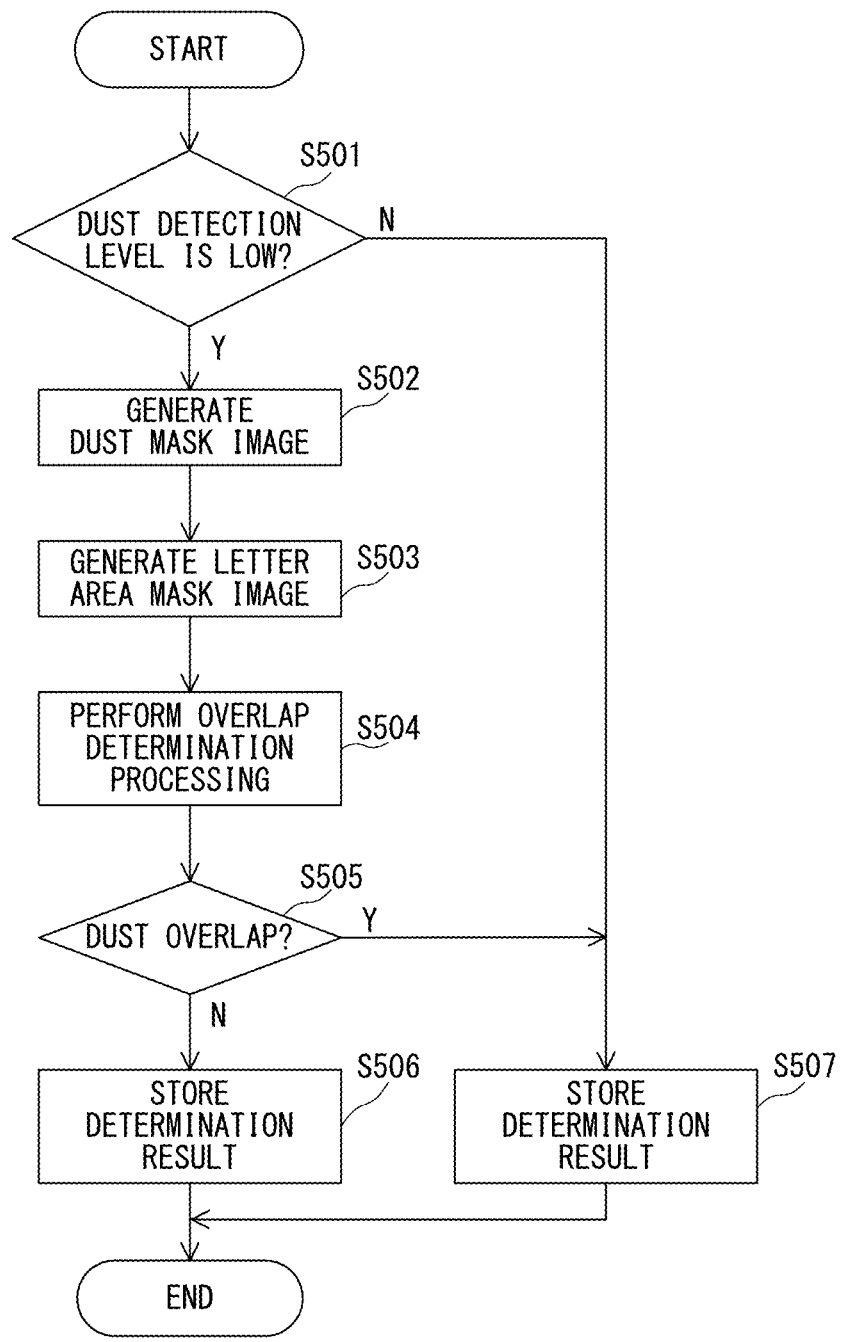
FIG. 21 is a flow chart for illustrating dust overlap determination processing.

FIG. 21 is a flow chart for illustrating the dust overlap determination processing in Step S305. This processing is executed by the system controller 320 (CPU 321). FIG. 22A to FIG. 22D are explanatory diagrams of the dust overlap determination processing in a case in which the dust streak area and the content area (in this case, the letter area) overlap each other. FIG. 23A to FIG. 23D are explanatory diagrams of the dust overlap determination processing in a case in which the dust streak area and the content area (in this case, the letter area) do not overlap each other.

In a case where the CPU 321 starts the dust overlap determination processing, the CPU 321 checks the dust detection level set by the user through the operation unit 326 (Step S501). In a case where the dust detection level is "high" (Step S501: N), the CPU 321 stores a determination result representing the dust overlap presence into a memory (Step S507), and ends the dust overlap determination processing.

In a case where the dust detection level is "low" (Step S501: Y), the CPU 321 performs dust mask image generation processing (Step S502). FIG. 22A shows a read image in a case in which the dust streak area and the letter area overlap each other. FIG. 23A shows a read image in a case in which the dust streak area and the letter area do not overlap each other. FIG. 22C shows dust mask images $GM_1$ to $GM_4$ corresponding to the read image of FIG. 22A. FIG. 23C shows dust mask images $GM_1'$ to $GM_4'$ corresponding to the read image of FIG. 23A. The dust mask image is an image for covering the dust streak area, which is a black area of each of FIG. 22C and FIG. 23C. In the dust mask image generation processing, dust mask images as those in FIG. 22C and FIG. 23C are generated based on the dust position information exemplified in FIG. 7, which is given as a notification from the CPU 301 of the reader controller 300.

The CPU 321 generates a letter area mask image after the dust mask image is generated (Step S503). The CPU 321 generates the letter area mask image by a publicly known image area separation method as described in Japanese Patent Application Laid-open No. 2016-066836, by the image area separator 328 included in the image processor 324. FIG. 22B and FIG. 23B show letter area mask images corresponding to the read images of FIG. 22A and FIG. 23A, respectively. The black areas of FIG. 22B and FIG. 23B are letter area mask images $X_1$ to $X_4$, which represent areas in which the letters are present on the read image.

After the letter area mask image is generated, the CPU 321 performs overlap determination processing (Step S504). The CPU 321 compares positions of respective pixels of the dust mask image and the letter area mask image for each pixel through the overlap determination processing, and detects a pixel being the dust streak area and the letter area as an overlap area. For example, in a case where the positions of the pixels are the same between the dust mask image and the letter area mask image for a predetermined number or more, it is determined that the dust overlap is present. FIG. 22D and FIG. 23D show overlap determination images which are results of the overlap determination processing corresponding to FIG. 22A and FIG. 23A, respectively. As overlap determination images $G_1X_1$ to $G_4X_4$, areas surrounded by the dotted lines represent the letter area and the dust streak area, and blacked-out areas each represent the overlap area of the letter area and the dust streak area.

The CPU 321 checks whether or not the overlap area is present in the overlap determination image (Step S505). As illustrated in FIG. 22D, in a case where the overlap area is present in the overlap determination image (Step S505: Y), the CPU 321 stores the dust overlap presence determination into a memory, and ends the processing (Step S507). As illustrated in FIG. 23D, in a case where the overlap area is absent in the overlap determination image (Step S505: N), the CPU 321 stores the dust overlap absence determination in the memory, and ends the dust overlap determination processing (Step S506).

Figure 24:
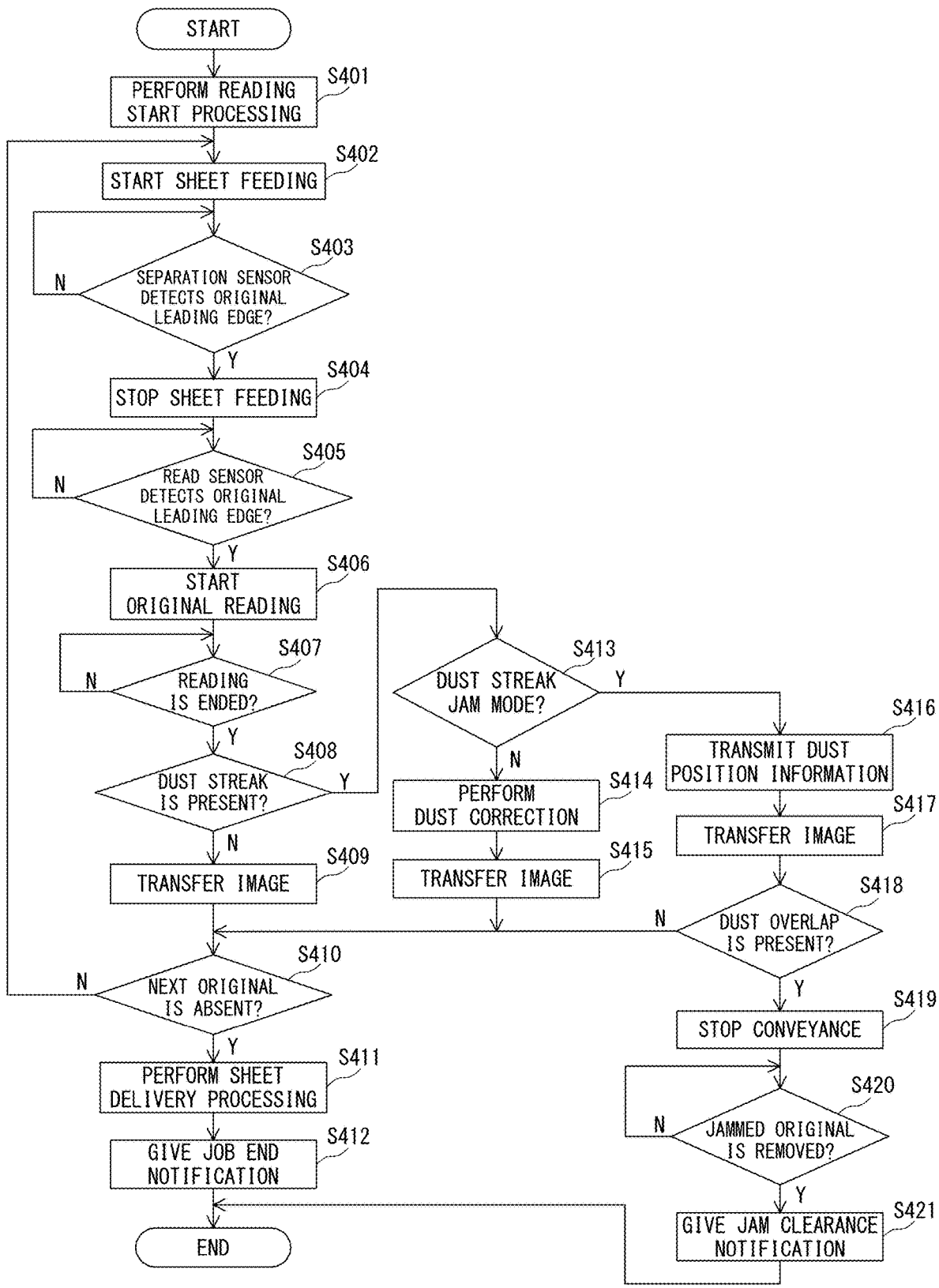
FIG. 24 is a flow chart for illustrating the flow reading processing.
Figure 25A:
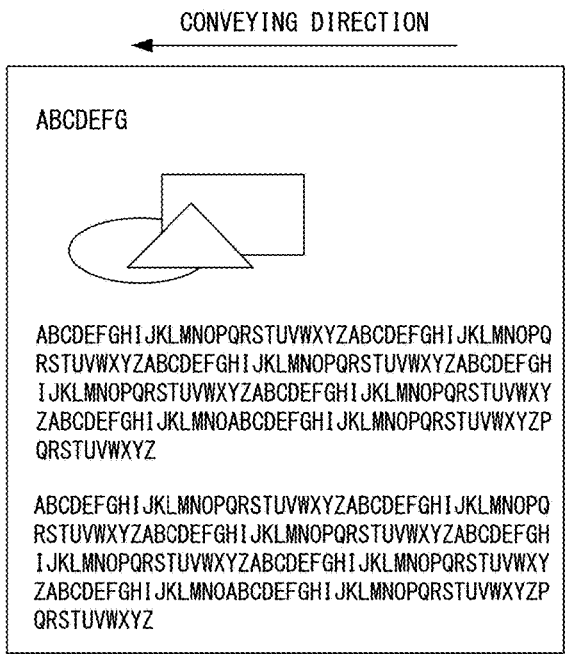
FIG. 25A, FIG. 25B, FIG. 25C, FIG. 25D, and FIG. 25E are explanatory diagrams of a dust streak.
Figure 25B:
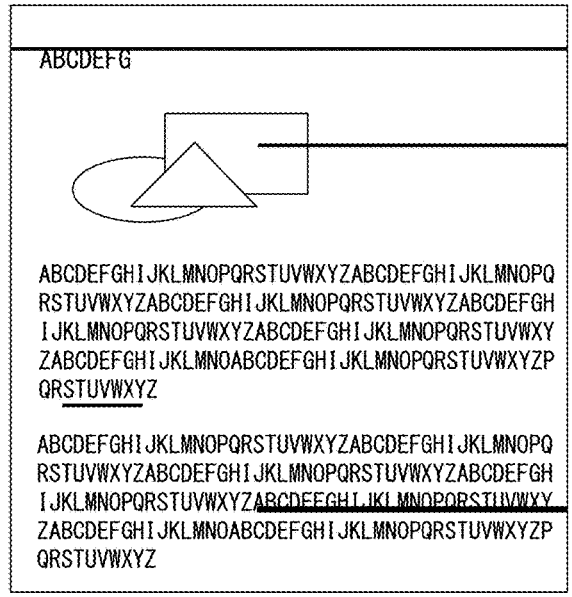
Figure 25C:
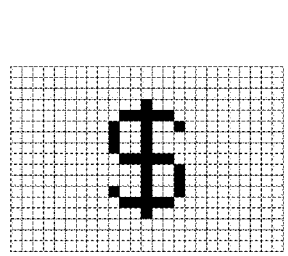
Figure 25D:
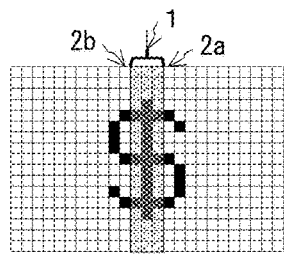
Figure 25E:
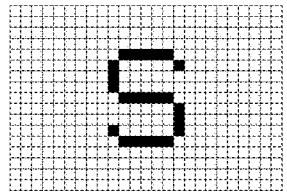

FIG. 24 is a flow chart for illustrating the flow reading processing of the original D using the ADF 200 in the second embodiment. This processing is executed by the reader controller 300 (CPU 301).

Similarly to the process steps of Step S201 to Step S206 of FIG. 17, in a case where the CPU 301 acquires the notification of the start of the flow reading processing from the CPU 321 of the system controller 320, the CPU 301 starts the original reading control (Step S401 to Step S406). After that, the CPU 301 waits for the notification of the reading end from the image processor 305 (Step S407: N). After the reading is ended (Step S407: Y), the CPU 301 checks the presence or absence of the dust streak on the image (Step S408).

In a case where the dust streak is present (Step S408: Y), the CPU 301 checks the operation mode designated from the CPU 321 of the system controller 320 (Step S413). In a case where the operation mode is the dust streak jam mode (Step S413: Y), the CPU 301 transmits the dust detection notification including the dust position information to the CPU 321 of the system controller 320 (Step S416), and performs the image transfer processing (Step S417). After that, the CPU 301 checks the notification of the dust overlap determination result from the CPU 321 of the system controller 320 (Step S418).

In a case where the dust overlap is present (Step S418: Y), the CPU 301 stops the conveyance motor 311 to stop the conveyance of the original D (Step S419). After that, the CPU 301 monitors the detection result obtained by each sensor on the conveyance path, and waits until the user removes all of the originals D on the conveyance path (Step S420: N). In a case where all of the originals D are removed (Step S420: Y), the CPU 301 notifies the CPU 321 of the system controller 320 of the jam clearance (Step S421).

In a case where the dust streak is present and the normal mode is designated from the CPU 321 of the system controller 320 (Step S408: Y, Step S413: N), the CPU 301 performs dust correction processing (Step S414), and performs image transfer processing (Step S415).

In a case where the dust streak is absent (Step S408: N), the CPU 301 performs image transfer processing of transferring the read image to the image processor 324 of the system controller 320 (Step S409). After the image transfer processing of Step S415 or Step S409 is executed, the CPU 301 checks the original detection sensor 204 (Step S410). Also in a case where the dust overlap is absent (Step S418: N), the CPU 301 checks the original detection sensor 204 (Step S410).

In a case where the next original is present (Step S410: N), the CPU 301 returns to the process step of Step S402, and drives the separation motor 310 to start the feeding of the next original. In a case where the next original is absent (Step S410: Y), as the sheet delivery processing, the CPU 301 drives the conveyance motor 311 by an amount corresponding to a predetermined distance, and then stops the conveyance motor 311 (Step S411). The CPU 301 notifies the CPU 321 of the system controller 320 of the reading end (Step S412), and ends the flow reading processing.

As described above, for example, at the time of electronic documentation processing, in a case where the dust streak is generated and thus the readability and the integrity of the original D cannot be ensured, the reader 1005 immediately stops the reading and notifies the user of the failure of the reading. In this manner, the user can be notified of the original D that does not satisfy legal requirements regarding the electronic documentation. Further, the determination is made during the reading and the user is notified of the determination. Thus, as compared to a case in which the user checks the failed original after all of the originals D are read, the user can check the failed original in a shorter procedure. Further, in a case where the readability and the integrity of the letters are required, in a case where the readability and the integrity of not only letters but also diagrams are required, and the like, the user can set the detection level of the dust detection jam in accordance with the original to be read, and hence erroneous detection of the dust detection jam can be suppressed.

As described above in the first embodiment and the second embodiment, in a case where a dust streak is generated in the read image, the image forming apparatus 1001 stops the conveyance of the original D, instructs the user to clean the flow reading glass and remove the conveyed original D, and urges the user to re-read the original D. The image forming apparatus 1001 may stop the conveyance of the original D, instruct the user to clean the flow reading glass and remove the conveyed original D, and urge the user to re-read the original D only in a case where the dust streak overlaps the letter or the diagram.

As described above, the image forming apparatus 1001 reliably detects the read image whose readability and integrity cannot be ensured at the time of the image reading processing which requires readability and integrity, and outputs an instruction of re-reading to the user so that an abnormal image is not detected. Thus, at the time of re-reading of the original D, the abnormal image is removed from the read image, and a read image ensuring readability and integrity can be obtained.

In the first embodiment and the second embodiment, the controller includes the reader controller 300 and the system controller 320, but those controllers may be integrally formed. For example, the image area separator 328 included in the image processor 324 of the system controller 320 may be a configuration included in the image processor 305 of the reader controller 300. That is, the generation of the mask image of each area performed by the image area separator 328 may be performed by the image processor 305 of the reader controller 300.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-016057, filed Feb. 6, 2023, which is hereby incorporated by reference herein in its entirety.

What is claimed is:

1. An image reading apparatus comprising:
a conveyor configured to convey an original;
a reader configured to read the original conveyed by the conveyor;
a detector configured to detect an abnormal image generated in a read image of the original obtained by the reader;
a correction processor configured to correct the abnormal image;
an operation unit configured to receive a setting of an operation mode set by a user;
a controller configured to, in a case where the detector detects the abnormal image:
control the correction processor to correct the abnormal image in a case in which a first operation mode of continuing image reading is set through the operation unit; and
stop conveyance of the original performed by the conveyor and give a notification of generation of the abnormal image in a case in which a second operation mode of interrupting the image reading is set through the operation unit; and
an image area separator configured to detect, from the read image, a content area in which a content of the original is formed and an abnormal image area in which the abnormal image is detected by the detector,
wherein the controller is configured to stop the conveyance of the original performed by the conveyor and give the notification of the generation of the abnormal image in a case where the second operation mode is set and the content area and the abnormal image area overlap each other, and
wherein the controller is configured to discard the read image of the original in a case where the content area and the abnormal image area overlap each other in the second operation mode.

2. The image reading apparatus according to claim 1, wherein the operation unit is configured to receive a setting of a detection level of the abnormal image set by the user, and
wherein the controller is configured to:
determine, in a case in which a first detection level is set, that the content area and the abnormal image area overlap each other in a case where the detector detects the abnormal image; and
determine, in a case in which a second detection level is set, that the content area and the abnormal image area overlap each other in a case where a first image for masking the content area and a second image for masking the abnormal image area overlap each other.

3. The image reading apparatus according to claim 2, wherein the controller is configured to determine overlap of the first image and the second image by comparing positions of pixels of the first image and the second image for each pixel.

4. The image reading apparatus according to claim 3, wherein the controller is configured to compare the first image and the second image with each other, and determine that the first image and the second image overlap each other in a case where the positions of the pixels are the same for a predetermined number or more.

5. The image reading apparatus according to claim 1, wherein the controller is configured to urge the user to clean a reading position at which the reader reads the original in a case where the detector detects the abnormal image.

6. The image reading apparatus according to claim 5, wherein the controller is configured to urge the user to re-read the original by the reader in a case where the detector detects the abnormal image.

7. An image reading method using an image reading device, the image reading device including:
a conveyor configured to convey an original;
a reader configured to read the original conveyed by the conveyor;
a detector configured to detect an abnormal image generated in a read image of the original obtained by the reader;
a correction processor configured to correct the abnormal image; and
an operation unit configured to receive a setting of an operation mode set by a user; and
an image area separator configured to detect, from the read image, a content area in which a content of the original is formed and an abnormal image area in which the abnormal image is detected by the detector,
the image reading method comprising, in a case where the detector detects the abnormal image:
correcting, by the correction processor, the abnormal image in a case in which a first operation mode of continuing image reading is set through the operation unit; and
stopping conveyance of the original performed by the conveyor and giving a notification of generation of the abnormal image in a case in which a second operation mode of interrupting the image reading is set through the operation unit,
wherein the conveyance of the original performed by the conveyor is stopped and the notification of the generation of the abnormal image is given in a case where the second operation mode is set and the content area and the abnormal image area overlap each other, and
wherein the read image of the original is discarded in a case where the content area and the abnormal image area overlap each other in the second operation mode.

8. An image reading apparatus comprising:
a conveyor configured to convey an original;
a reader configured to read the original conveyed by the conveyor;
a detector configured to detect an abnormal image generated in a read image of the original obtained by the reader;
a correction processor configured to correct the abnormal image;
an operation unit configured to receive a setting of an operation mode set by a user;
a controller configured to, in a case where the detector detects the abnormal image:

control the correction processor to correct the abnormal image in a case in which a first operation mode of continuing image reading is set through the operation unit; and stop conveyance of the original performed by the conveyor and give a notification of generation of the abnormal image in a case in which a second operation mode of interrupting the image reading is set through the operation unit; and an image area separator configured to detect, from the read image, a content area in which a content of the original is formed and an abnormal image area in which the abnormal image is detected by the detector, wherein the controller is configured to stop the conveyance of the original performed by the conveyor and give the notification of the generation of the abnormal image in a case where the second operation mode is set and the content area and the abnormal image area overlap each other, wherein the operation unit is configured to receive a setting of a detection level of the abnormal image set by the user, and wherein the controller is configured to:
determine, in a case in which a first detection level is set, that the content area and the abnormal image area overlap each other in a case where the detector detects the abnormal image; and determine, in a case in which a second detection level is set, that the content area and the abnormal image area overlap each other in a case where a first image for masking the content area and a second image for masking the abnormal image area overlap each other.

9. The image reading apparatus according to claim 8, wherein the controller is configured to determine overlap of the first image and the second image by comparing positions of pixels of the first image and the second image for each pixel.

10. The image reading apparatus according to claim 9, wherein the controller is configured to compare the first image and the second image with each other, and determine that the first image and the second image overlap each other in a case where the positions of the pixels are the same for a predetermined number or more.

* * * * *